US011341696B2

(12) United States Patent
Mizutani

(10) Patent No.: US 11,341,696 B2
(45) Date of Patent: *May 24, 2022

(54) PRINT DATA EDIT APPARATUS AND RECORDING MEDIUM

(71) Applicant: Brother Kogyo Kabushiki Kaisha, Nagoya (JP)

(72) Inventor: Aiko Mizutani, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/706,316

(22) Filed: Dec. 6, 2019

(65) Prior Publication Data

US 2020/0111245 A1    Apr. 9, 2020

Related U.S. Application Data

(63) Continuation of application No. 16/128,563, filed on Sep. 12, 2018, now Pat. No. 10,529,108.

(30) Foreign Application Priority Data

Sep. 15, 2017  (JP) .............................. JP2017-177954

(51) Int. Cl.
*G06T 11/60* (2006.01)
*H04N 1/00* (2006.01)
(Continued)

(52) U.S. Cl.
CPC ............ *G06T 11/60* (2013.01); *G06F 3/0486* (2013.01); *G06F 3/04845* (2013.01); *H04N 1/00167* (2013.01)

(58) Field of Classification Search
CPC .... G06T 11/60; G06F 3/04845; G06F 3/0486; H04N 1/00167
See application file for complete search history.

(56) References Cited

U.S. PATENT DOCUMENTS 8,009,964 B2 * 8/2011 Ishida .................... B41J 3/4075
386/248
9,219,830 B1 * 12/2015 Ciorba ............... H04N 1/00164
(Continued)

FOREIGN PATENT DOCUMENTS

JP    2006-243388 A    9/2006

OTHER PUBLICATIONS

P-Touch | How To | Printing from a Database (YouTube video, "https://www.youtube.com/watch?v=-RAzyVF5MmY", Sep. 7, 2015) (Year: 2015).*

(Continued)

*Primary Examiner* — Yu Chen
(74) *Attorney, Agent, or Firm* — Banner & Witcoff, Ltd.

(57) ABSTRACT

The disclosure discloses a print data edit apparatus including a controller configured to execute a first display control process and a second display control process. In the first display control process, an edit display screen is displayed on a display device. The edit display screen includes a print setting area, an editing area, and an individual setting area, that are disposed side by side with each other from one side toward the other side along a left-to-right direction. A disposing area is displayed at least at a lower portion of the editing area on the display device. In the second display control process, a data file is expanded and displayed in the disposing area in the case that a first indicator of the data file is dragged and dropped to the disposing area via the operation device.

14 Claims, 25 Drawing Sheets

(51) Int. Cl.
*G06F 3/0486* (2013.01)
*G06F 3/04845* (2022.01)

(56) References Cited

U.S. PATENT DOCUMENTS

| | | | |
|---|---|---|---|
| 2003/0160824 A1* | 8/2003 | Szumla | G06T 11/60 |
| | | | 715/769 |
| 2006/0190423 A1* | 8/2006 | Tanaka | G06F 40/186 |
| 2008/0074697 A1* | 3/2008 | Sawada | B41J 3/01 |
| | | | 358/1.15 |
| 2008/0231898 A1 | 9/2008 | Iwanaga et al. | |
| 2009/0138812 A1* | 5/2009 | Ikedo | G06F 40/103 |
| | | | 715/769 |
| 2009/0327872 A1* | 12/2009 | Kamiyama | G06F 40/166 |
| | | | 715/243 |
| 2014/0226169 A1 | 8/2014 | Jacobs et al. | |
| 2014/0281937 A1* | 9/2014 | Jacobs | G06F 3/0486 |
| | | | 715/255 |
| 2014/0282077 A1* | 9/2014 | Wilson | G06F 3/03545 |
| | | | 715/751 |
| 2015/0109630 A1* | 4/2015 | Hiramoto | H04N 1/00482 |
| | | | 358/1.13 |
| 2015/0212854 A1* | 7/2015 | Tsukuda | G06F 3/1253 |
| | | | 718/102 |
| 2016/0139761 A1* | 5/2016 | Grosz | G06F 3/0482 |
| | | | 715/769 |
| 2017/0134663 A1* | 5/2017 | Jin | G06T 11/001 |
| 2019/0087137 A1 | 3/2019 | Yasui | |

OTHER PUBLICATIONS

Feb. 26, 2021—(JP) Notice of Reasons for Refusal—App 2017-177954, Eng Tran.
"P. Touch | How To | Printing from a Database | EN", YouTube, Sep. 7, 2015, internet search on Feb. 12, 2021 [https://www.youtube.com/watch?v=-RAzyVF5MmY].
Jun. 18, 2021—(JP) Decision to Grant and Memorandum of Decision to Grant—JP App 2017-177954 Eng Tran.

* cited by examiner

[FIG. 1]
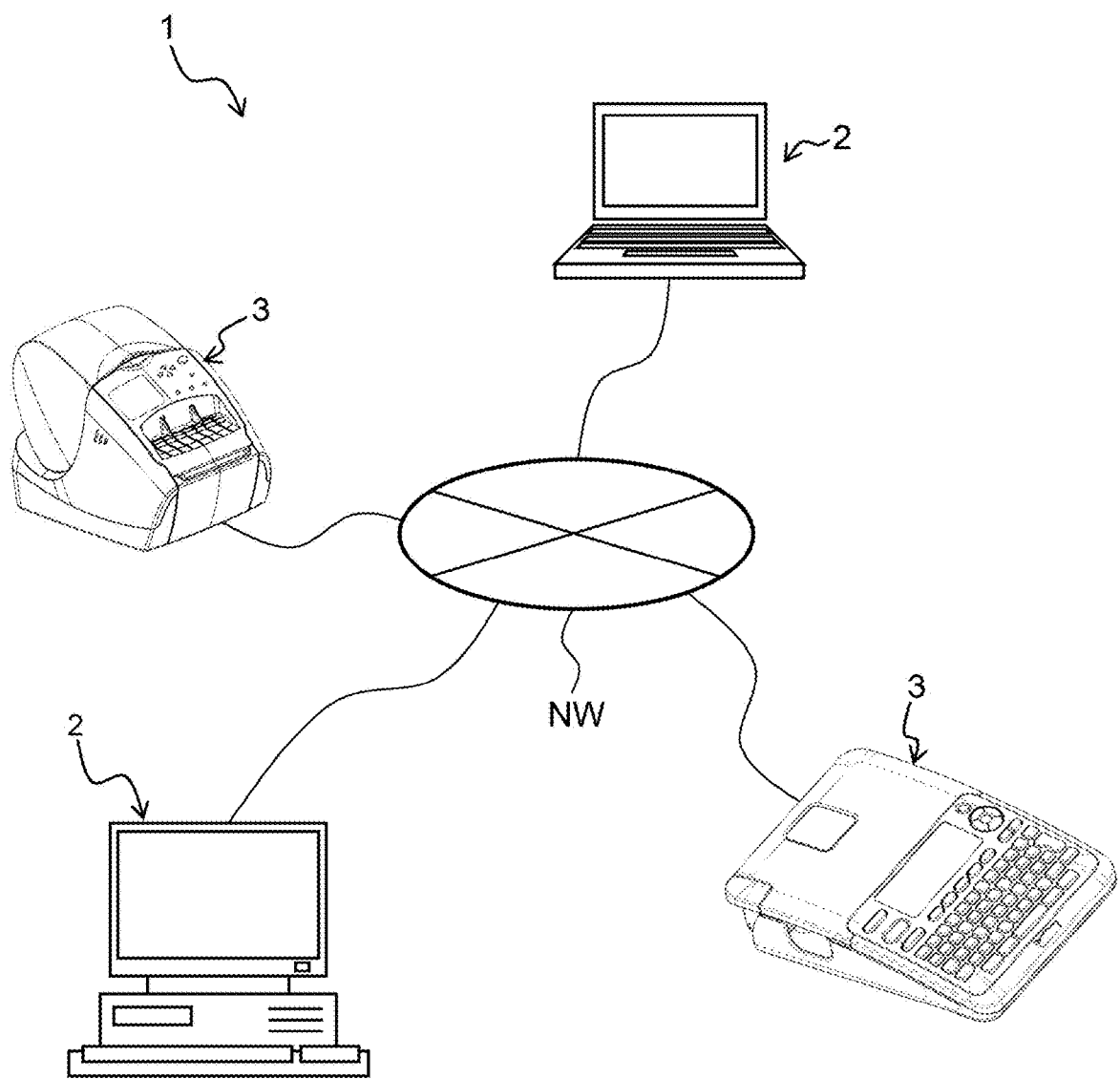

[FIG. 2]
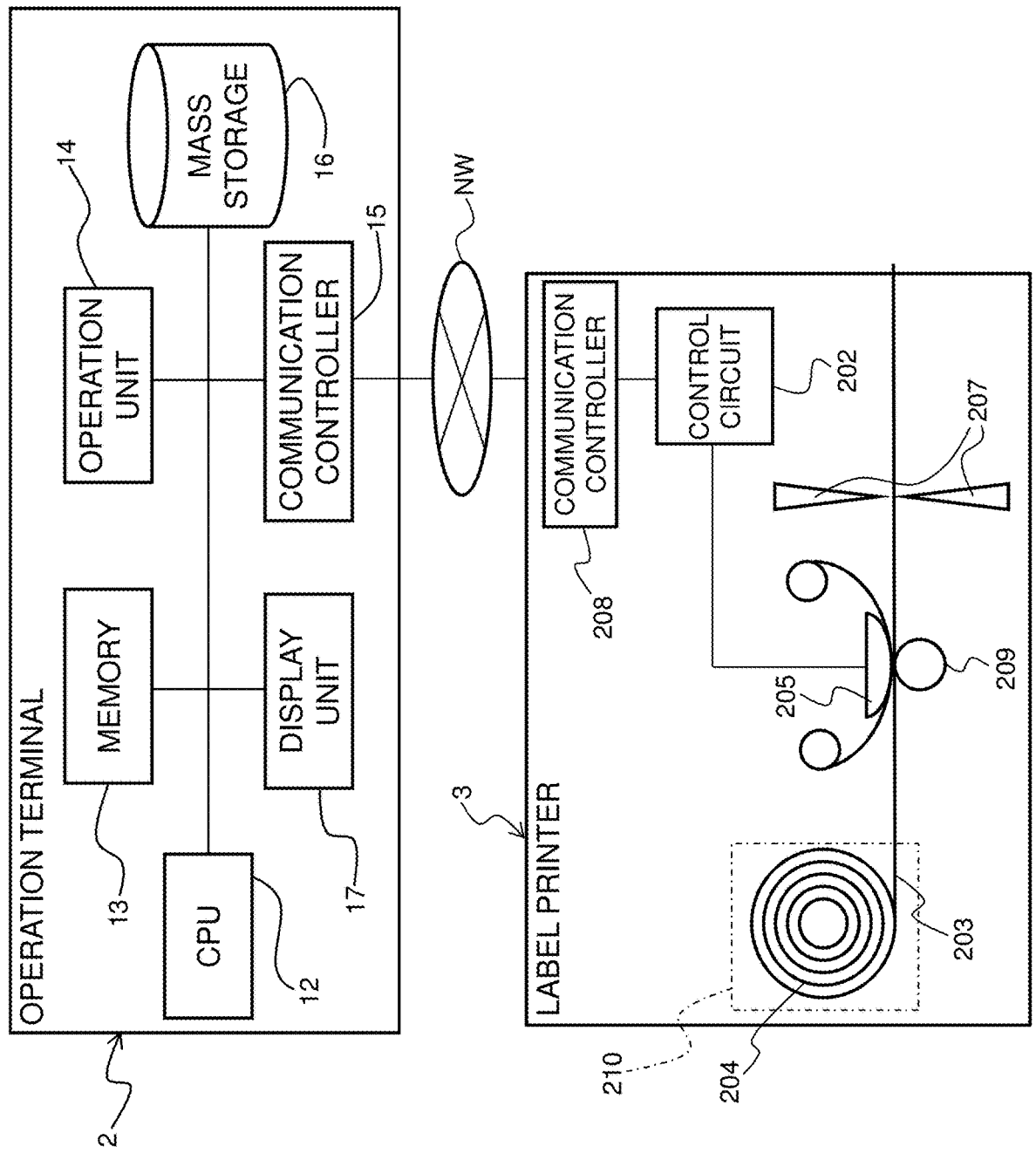

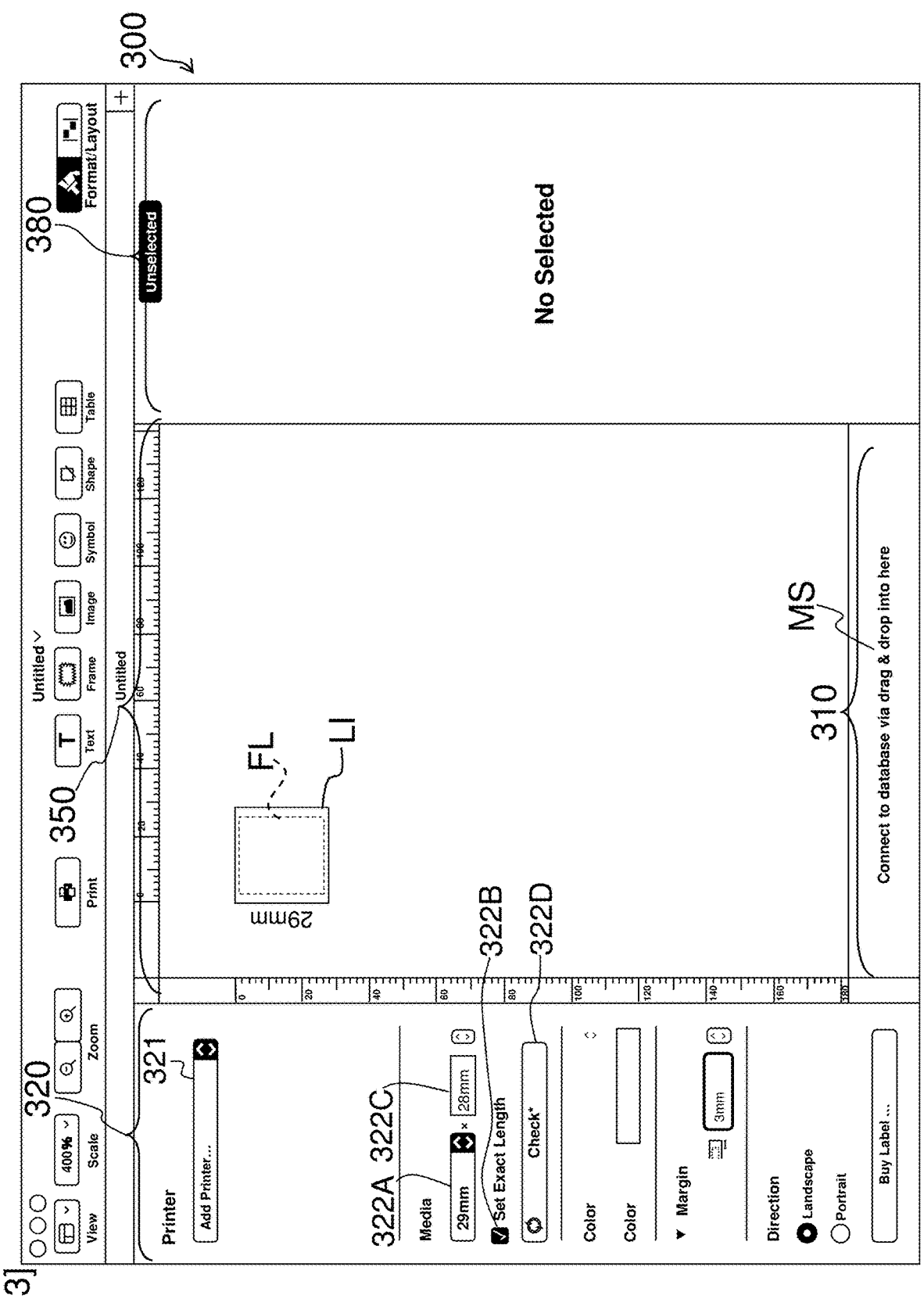
[FIG. 3]

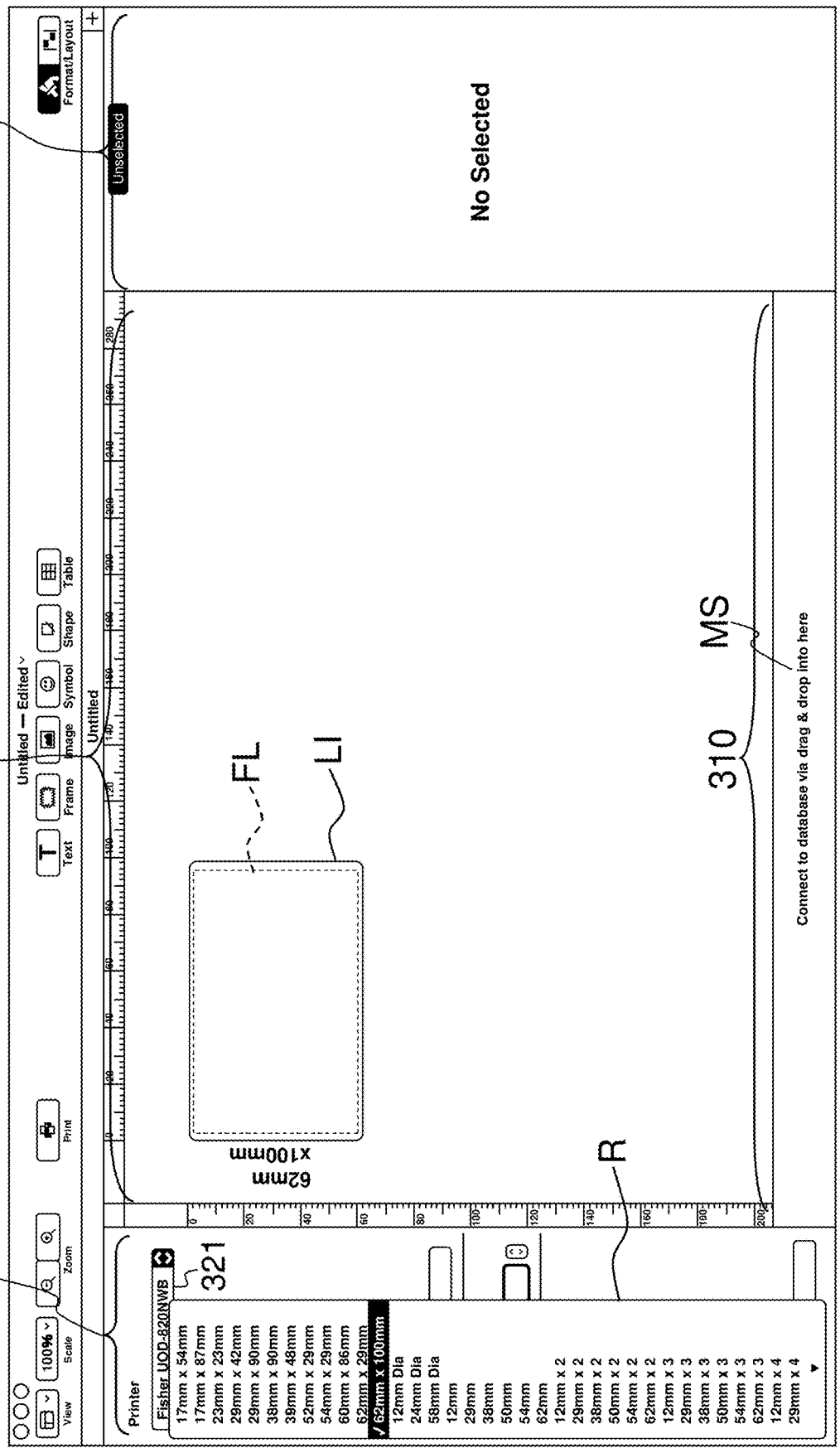

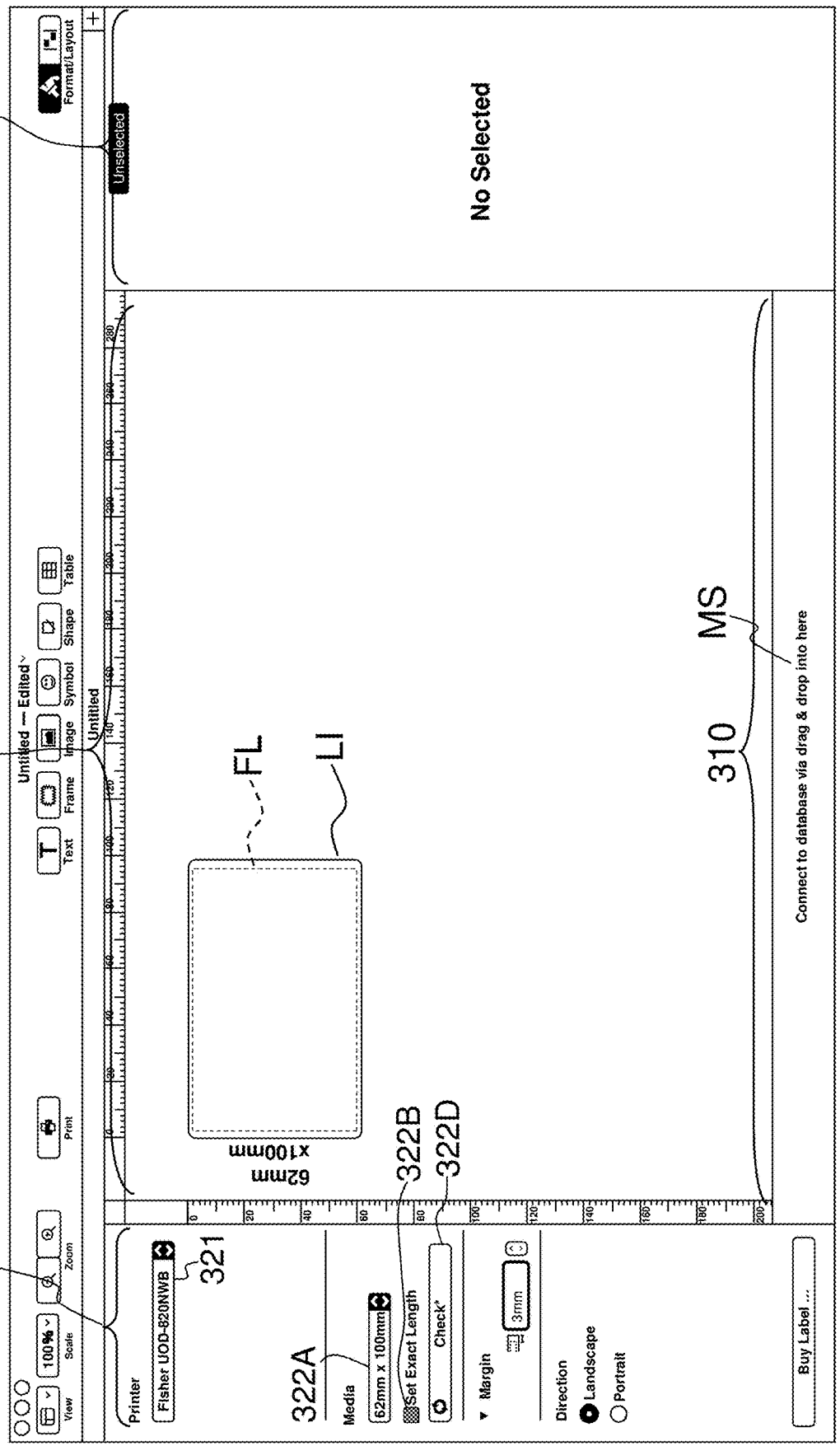

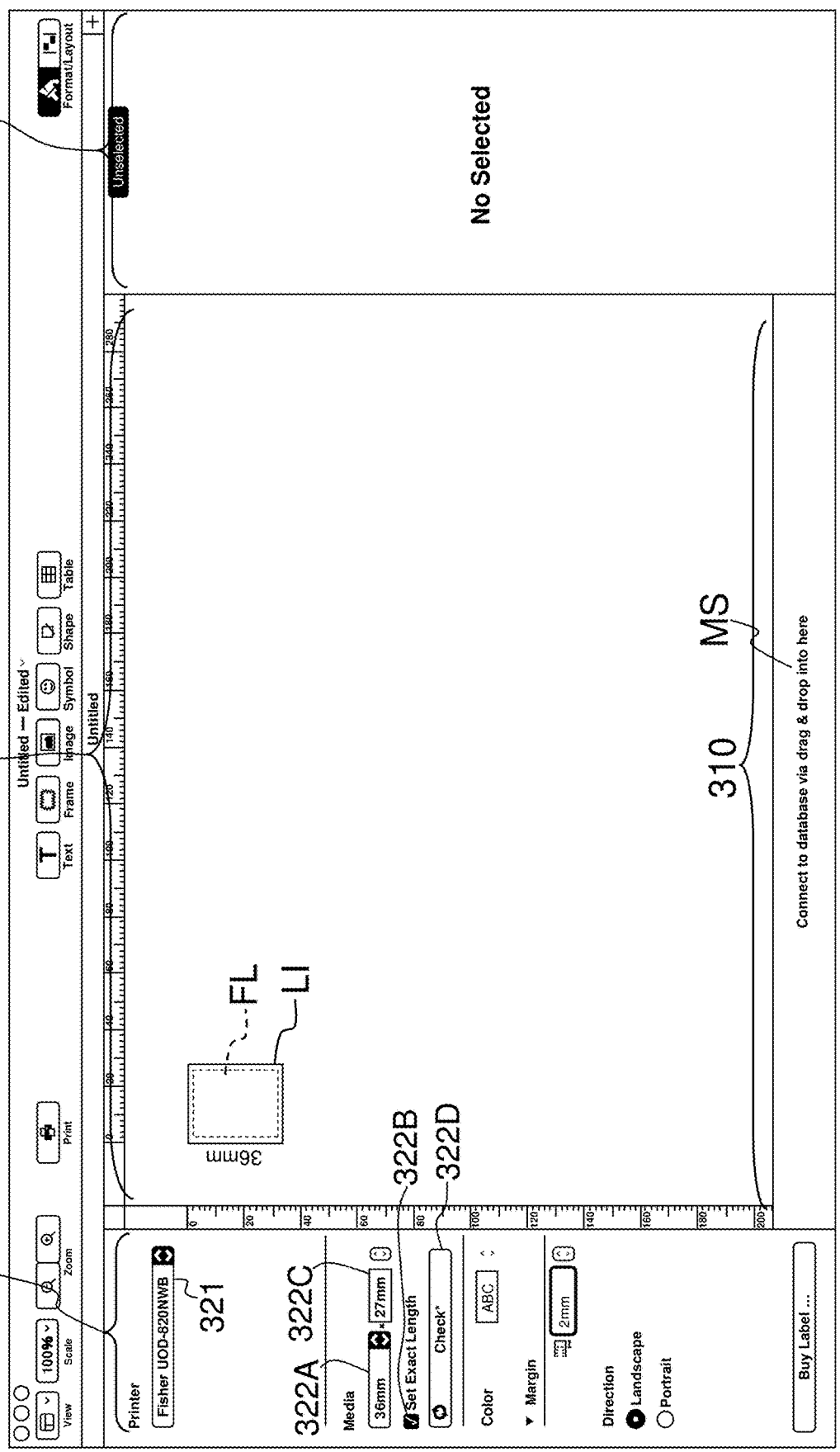

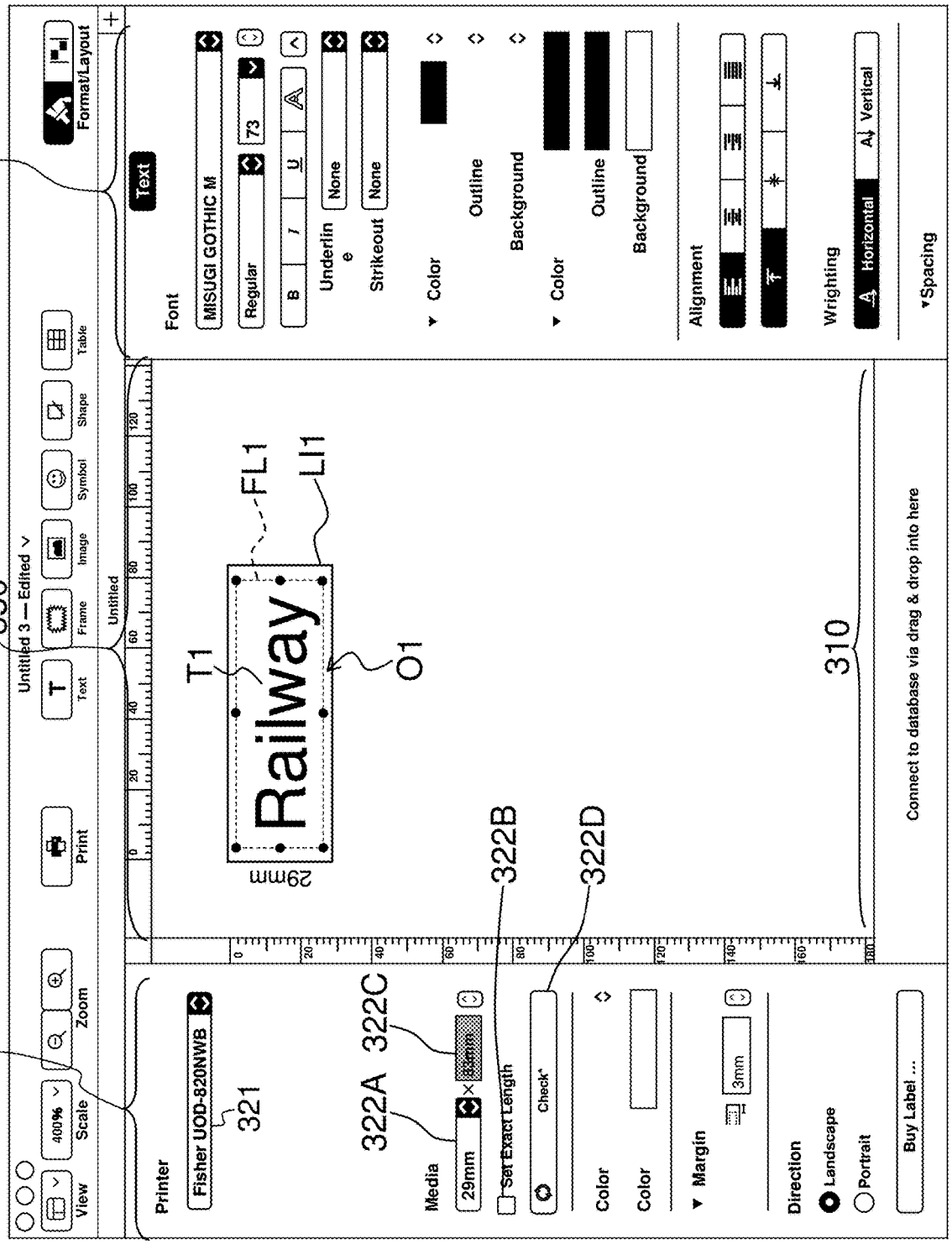

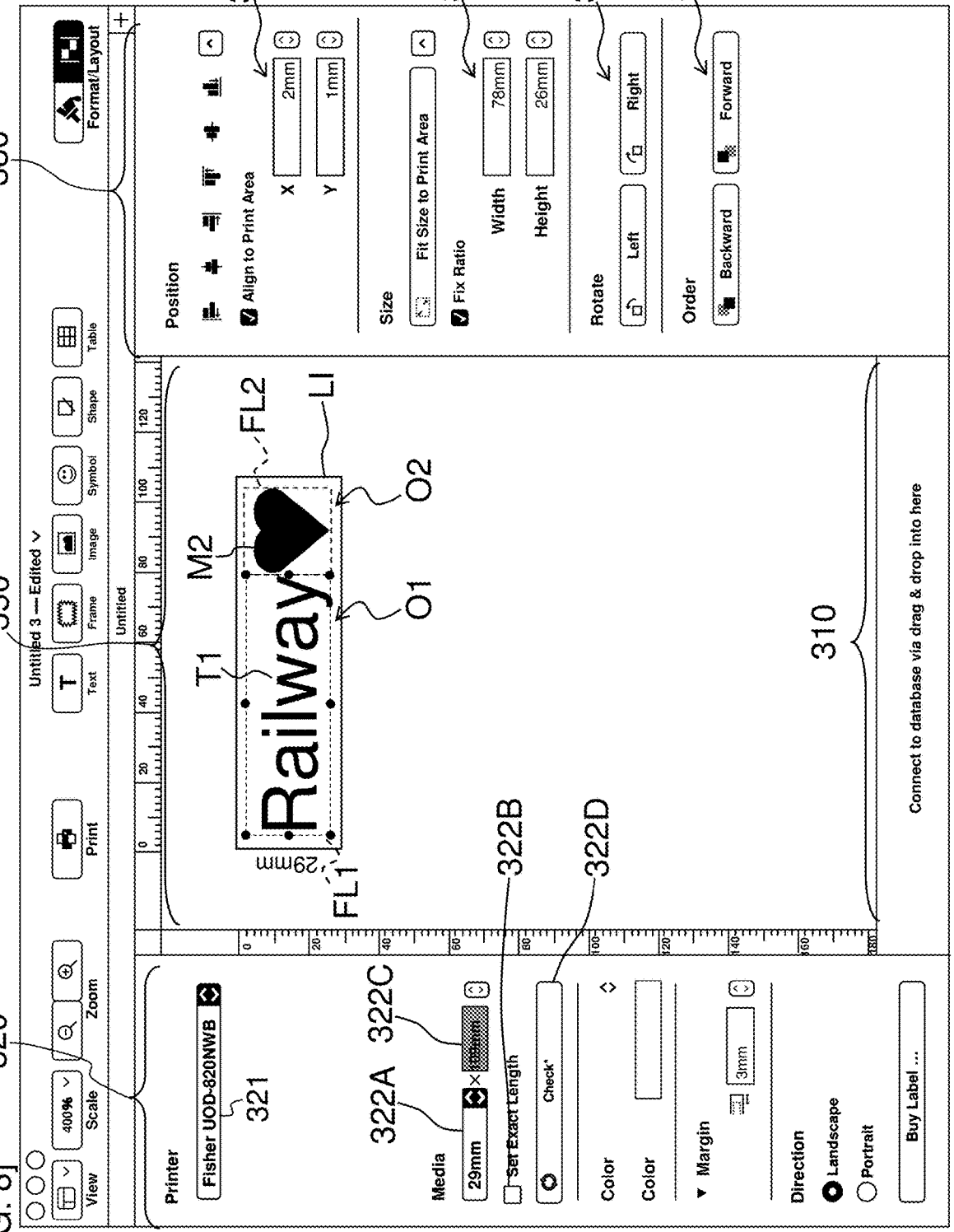

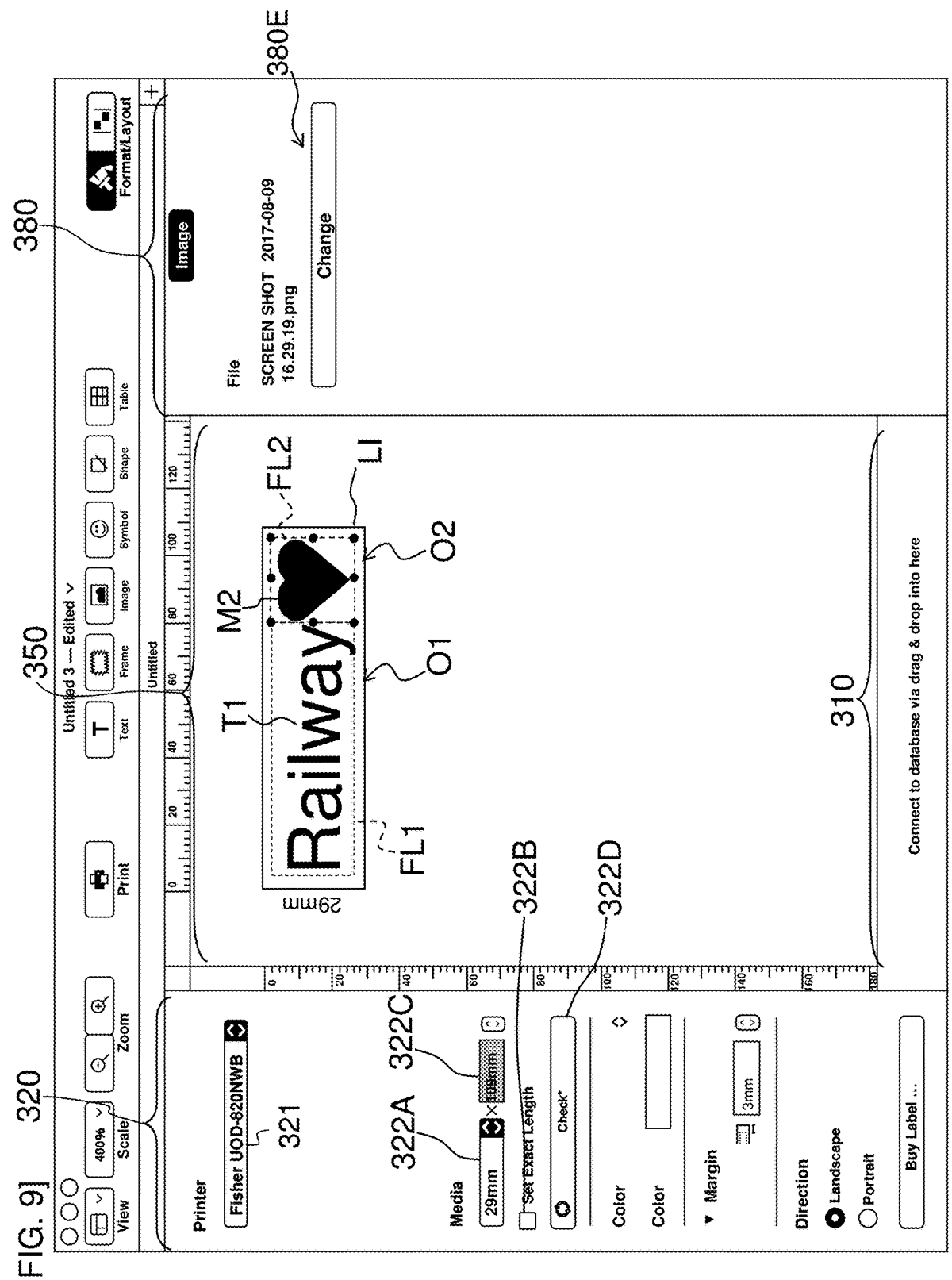

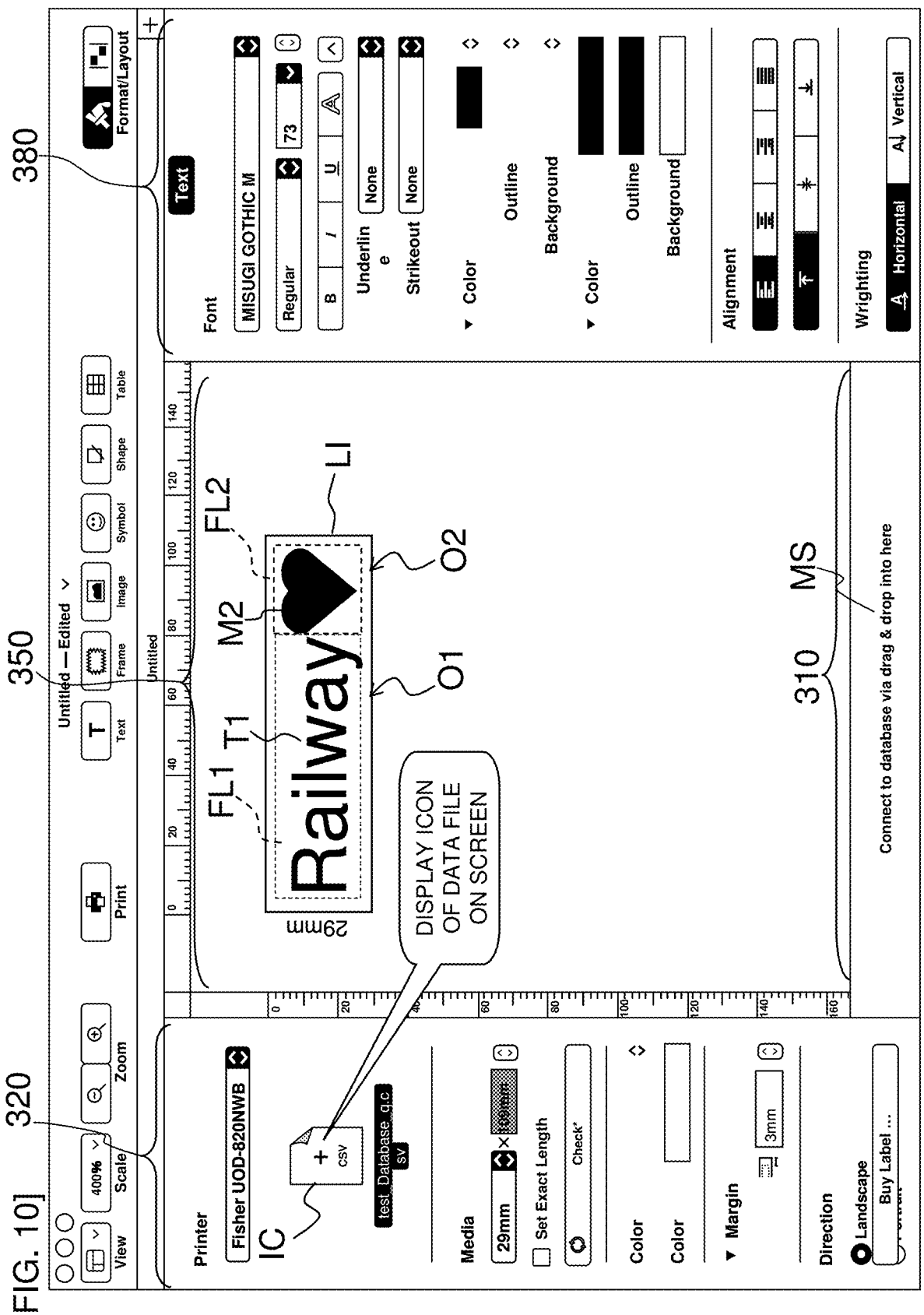

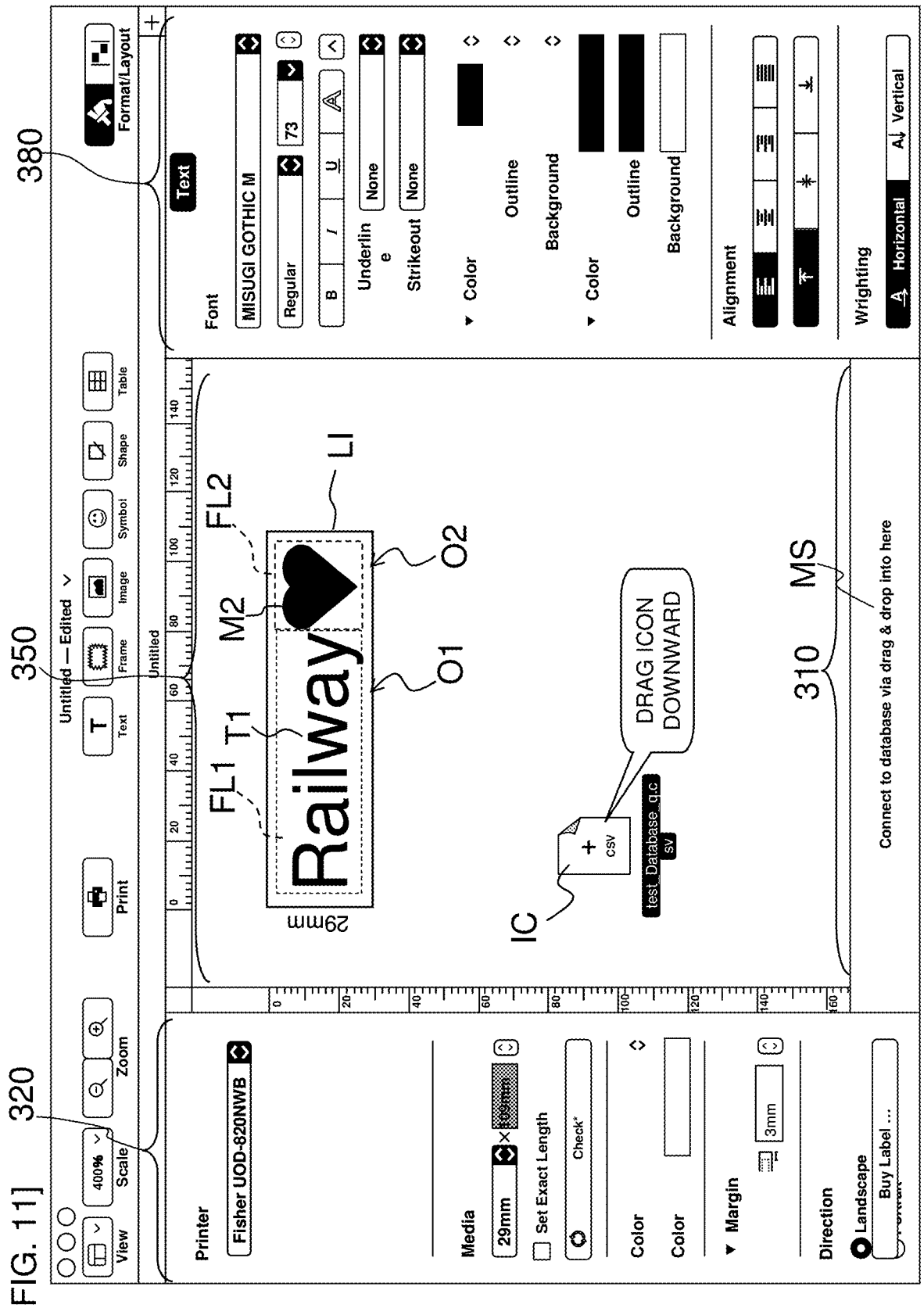

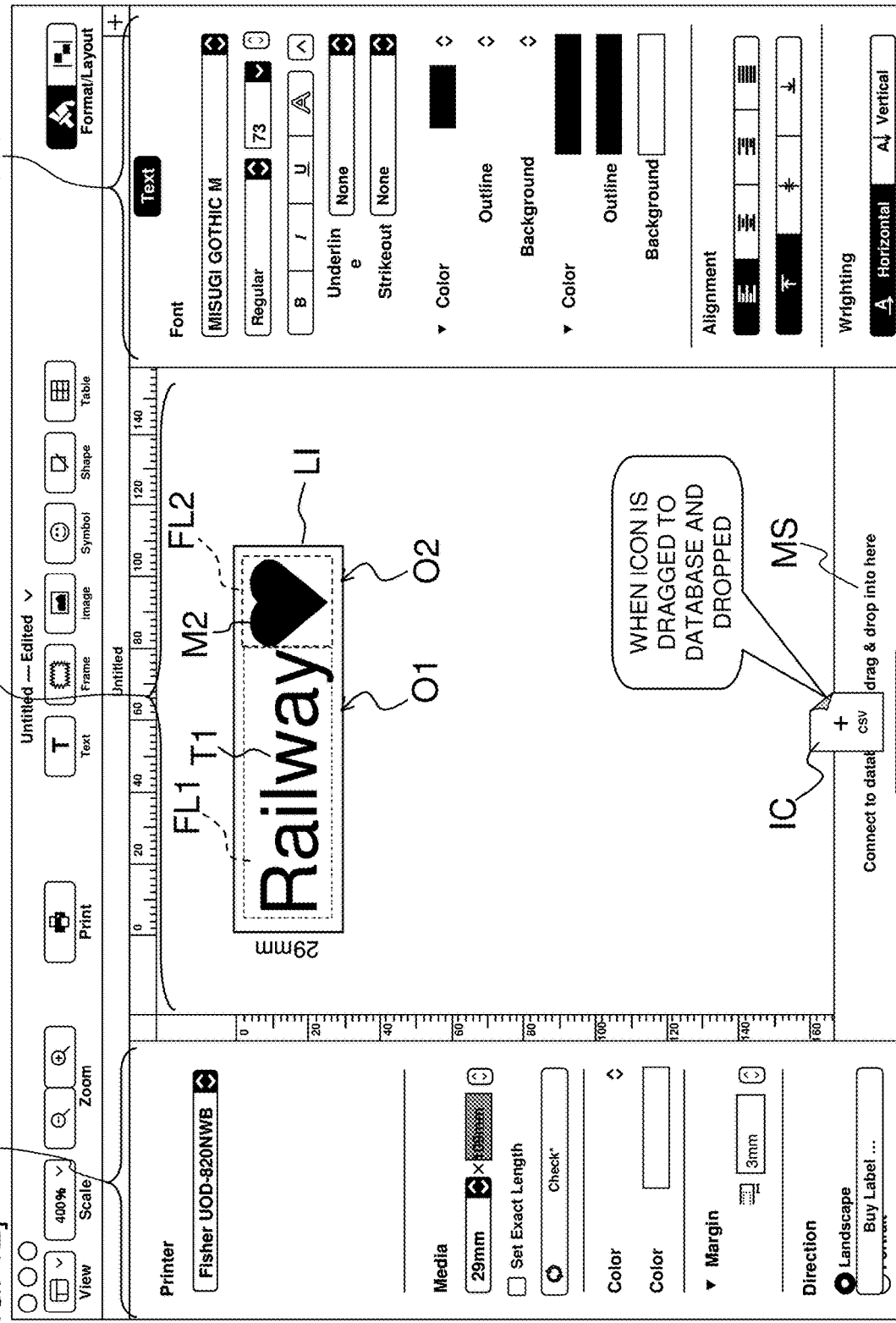
[FIG. 12]

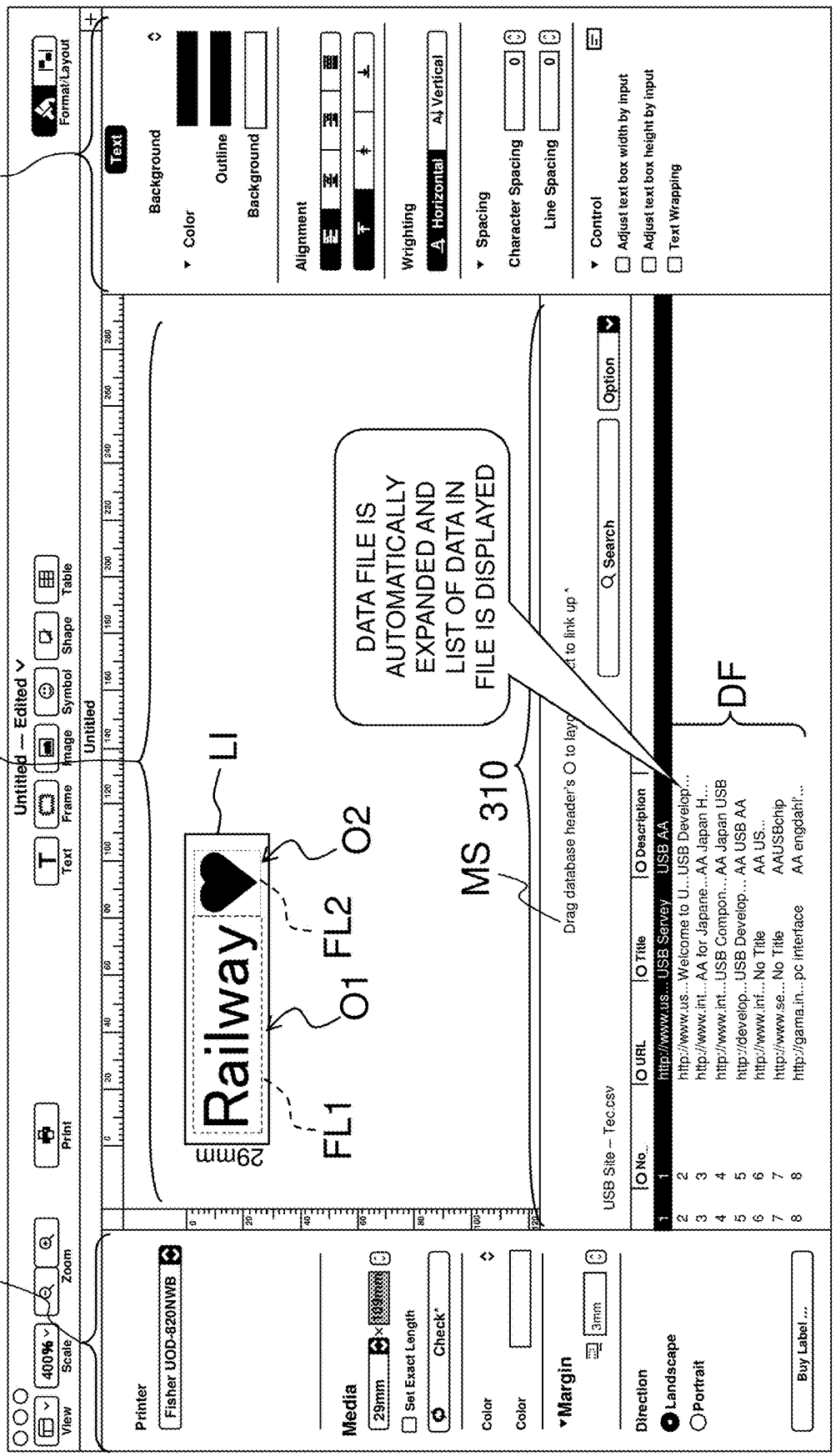
[FIG. 13]

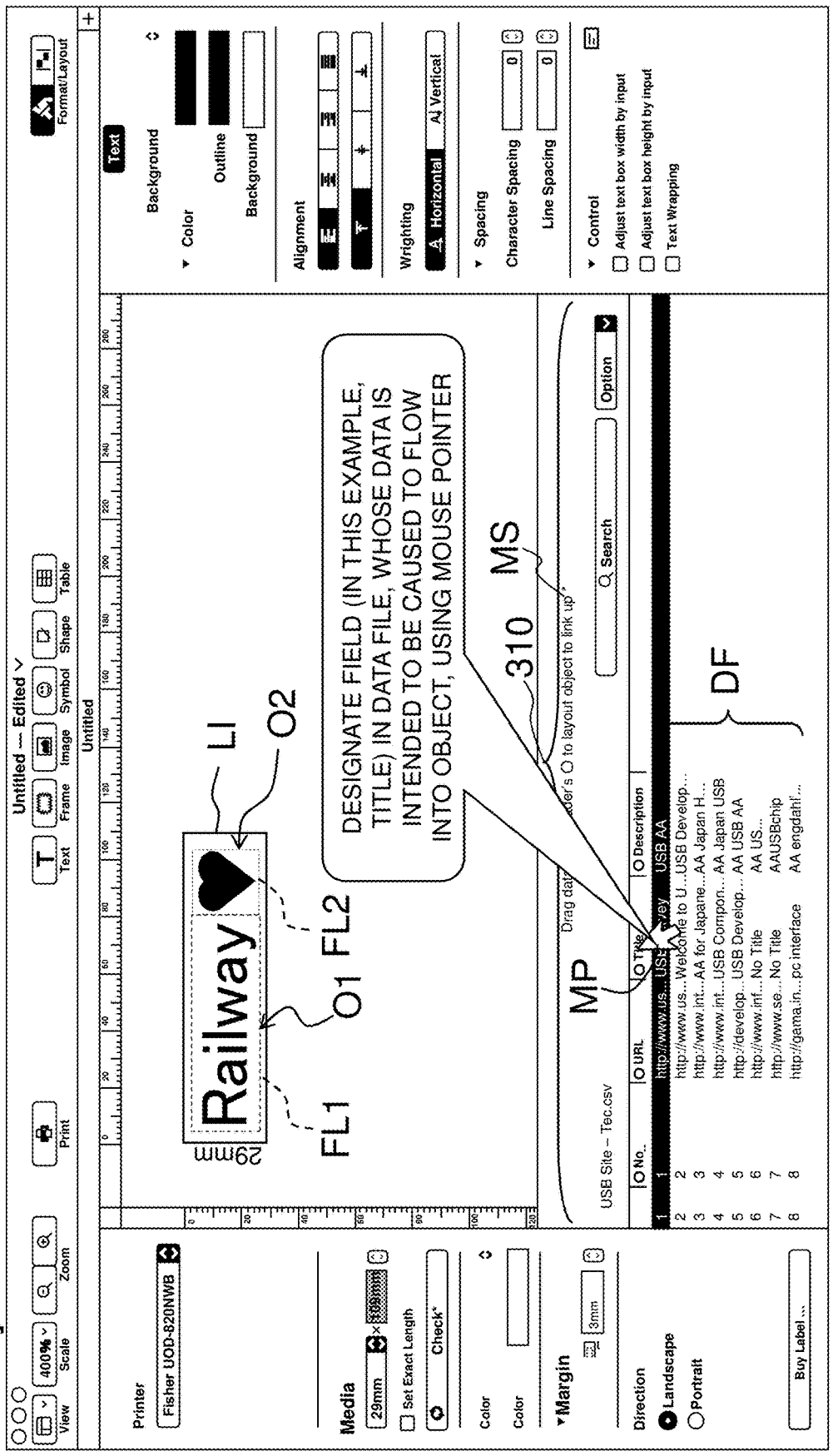
[FIG. 14]

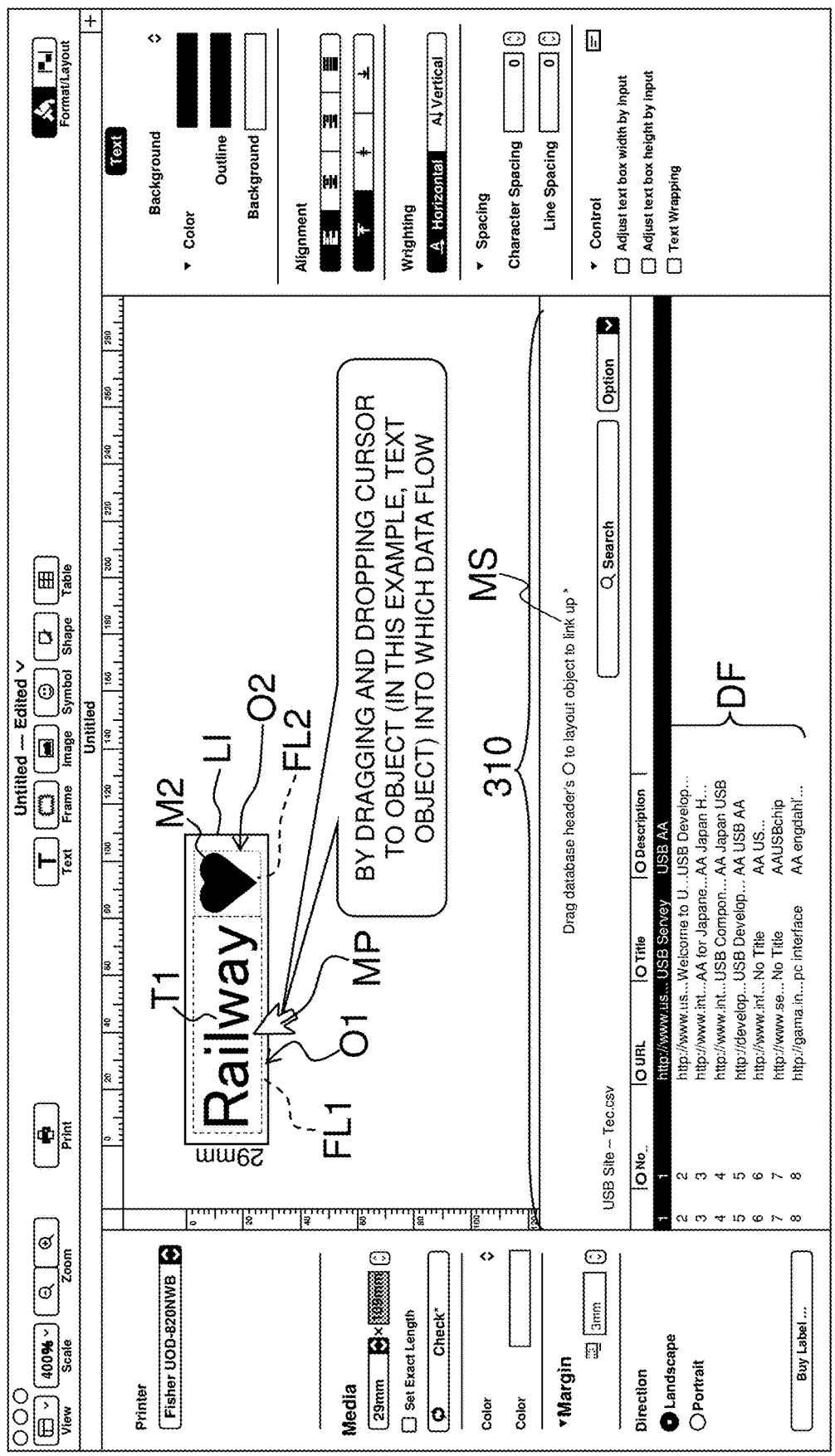
[FIG. 15]

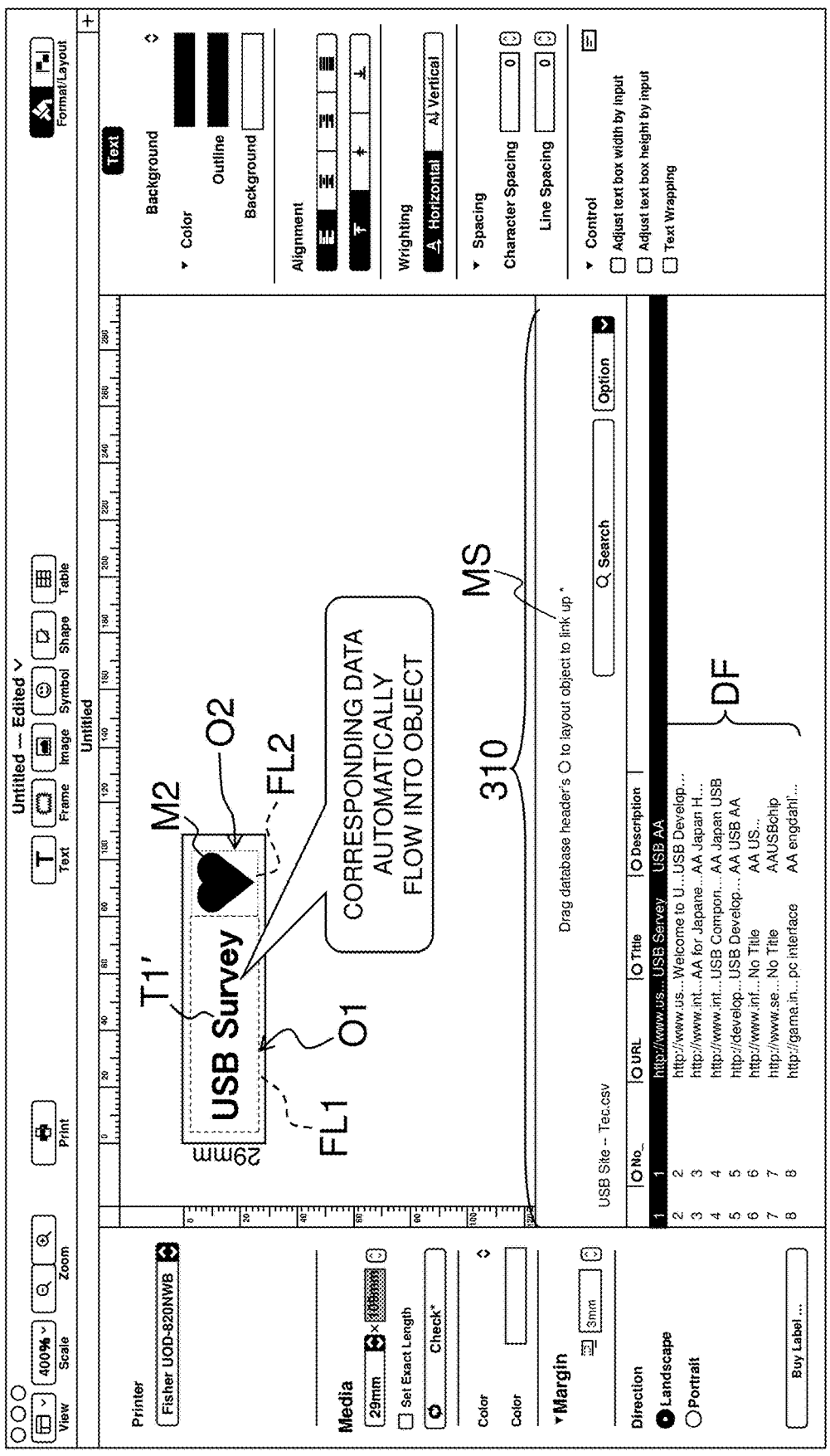
[FIG. 16]

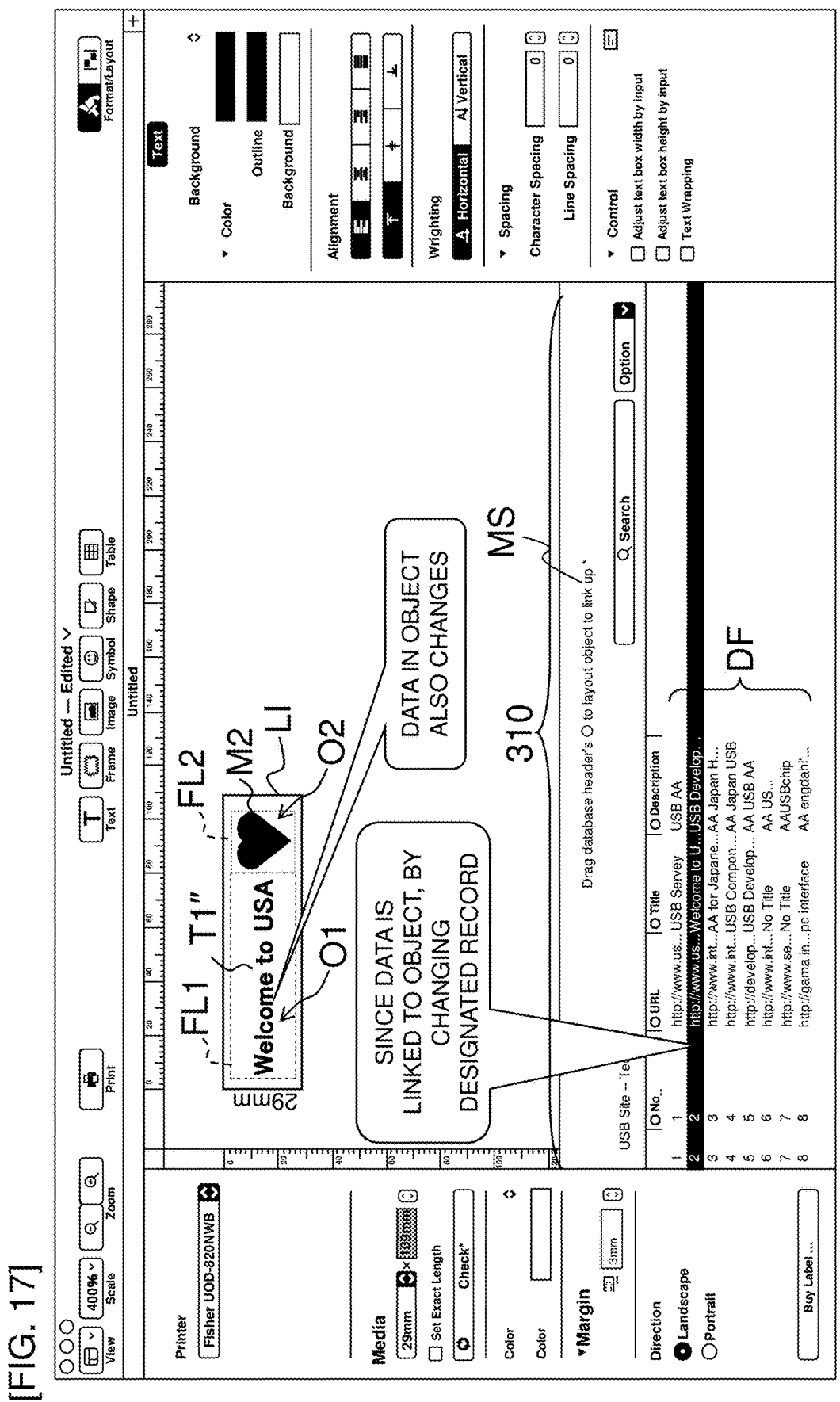
[FIG. 17]

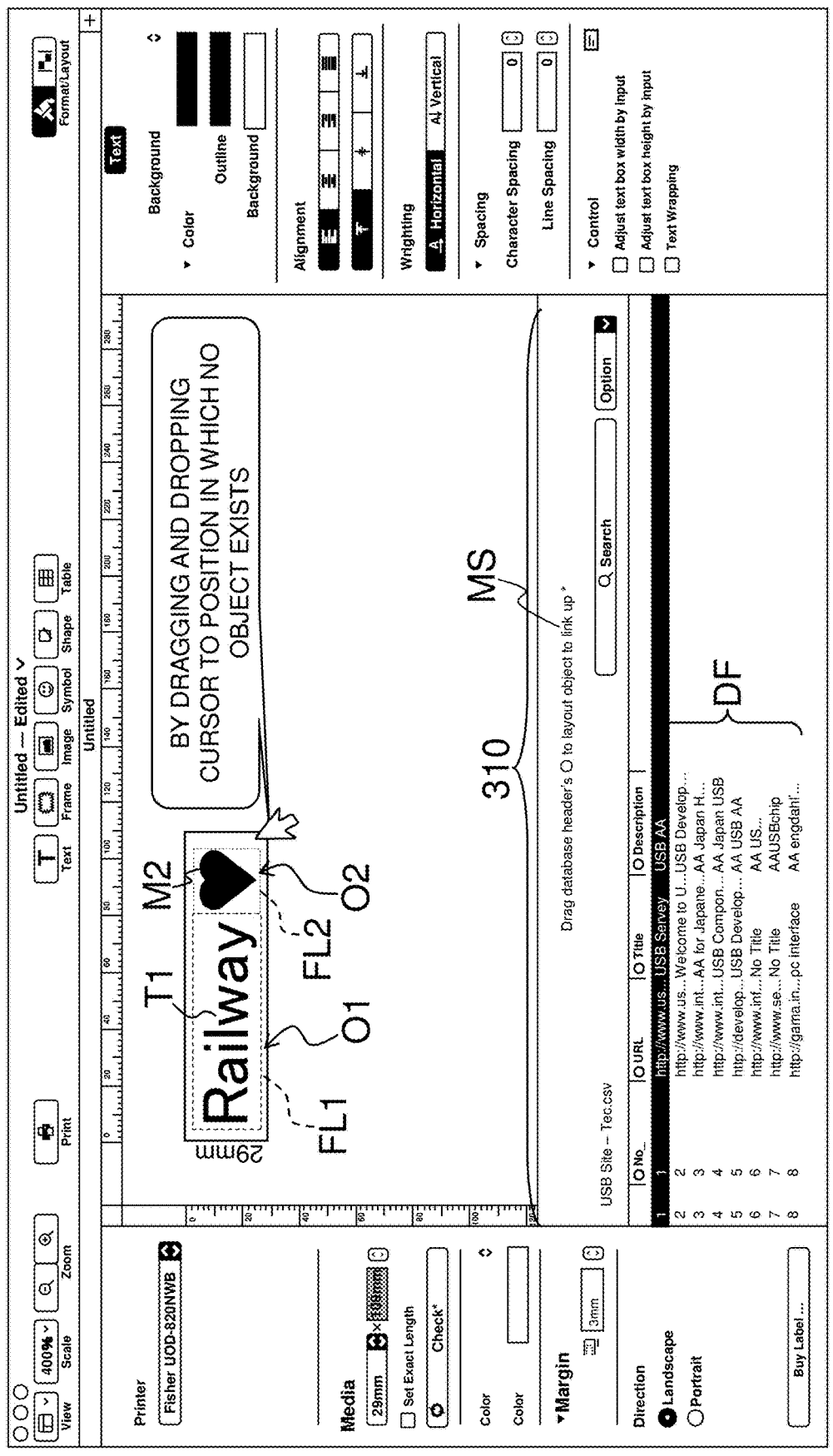
[FIG. 18]

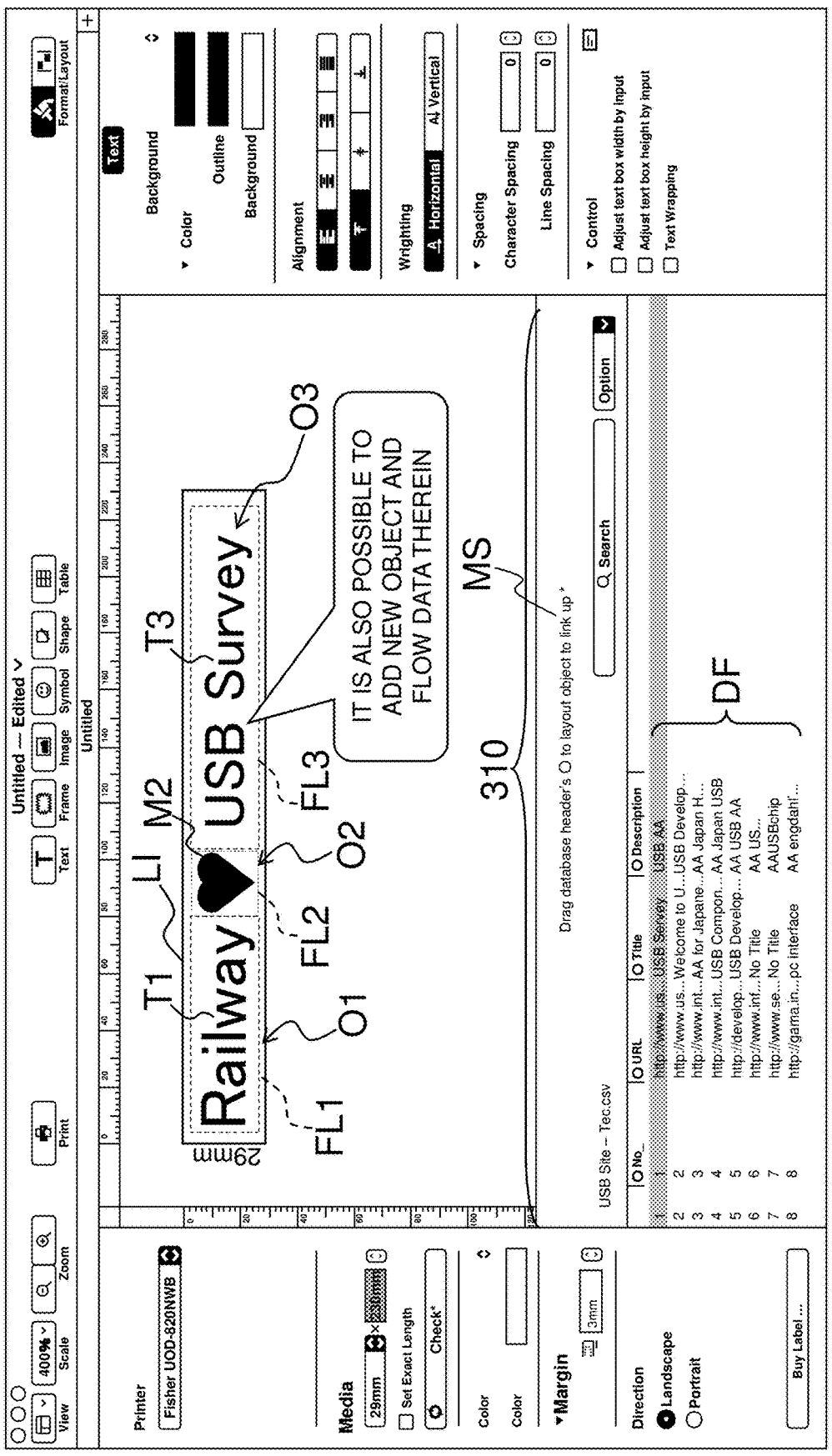
[FIG. 19]

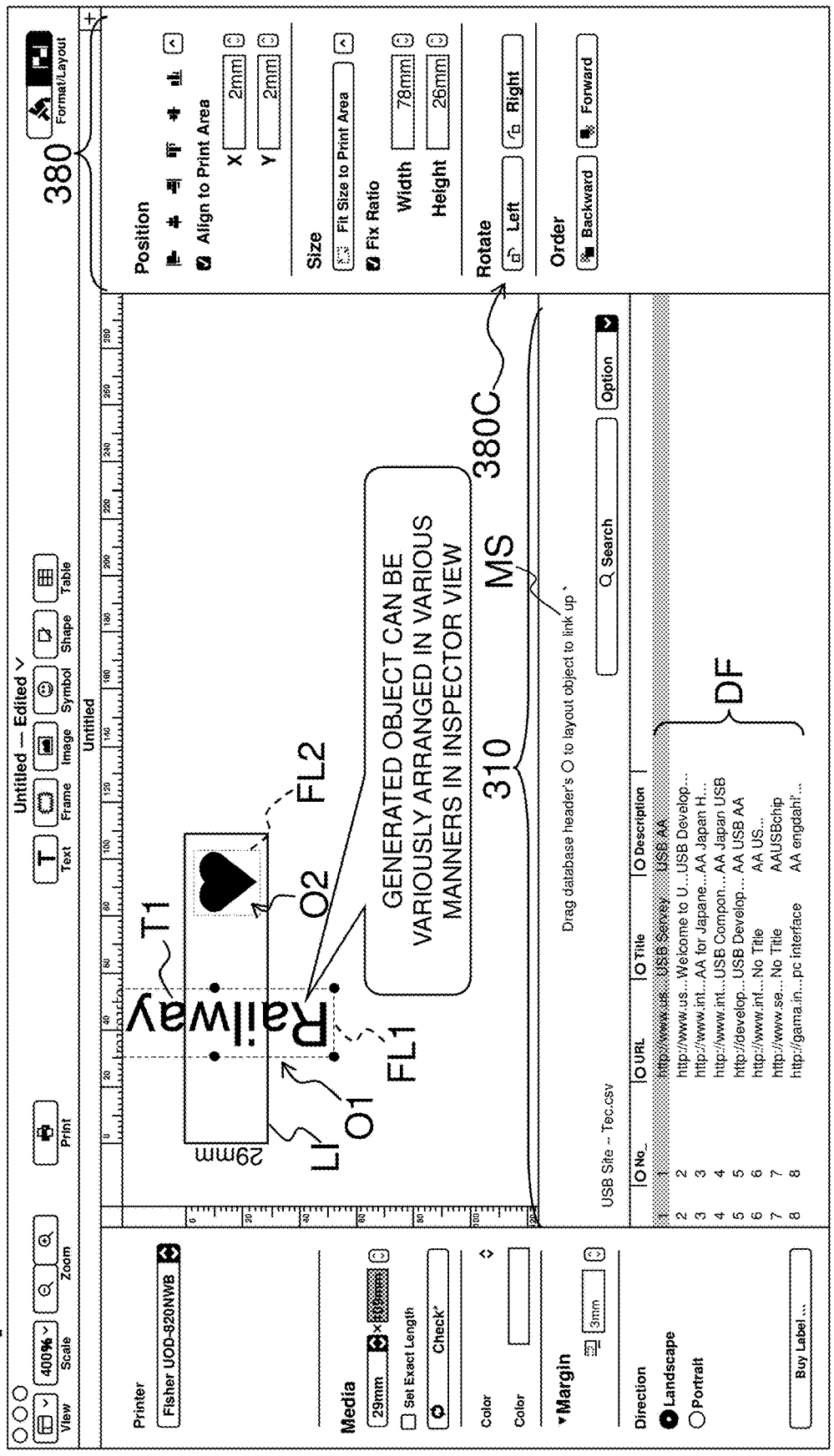
[FIG. 20]

[FIG. 21]
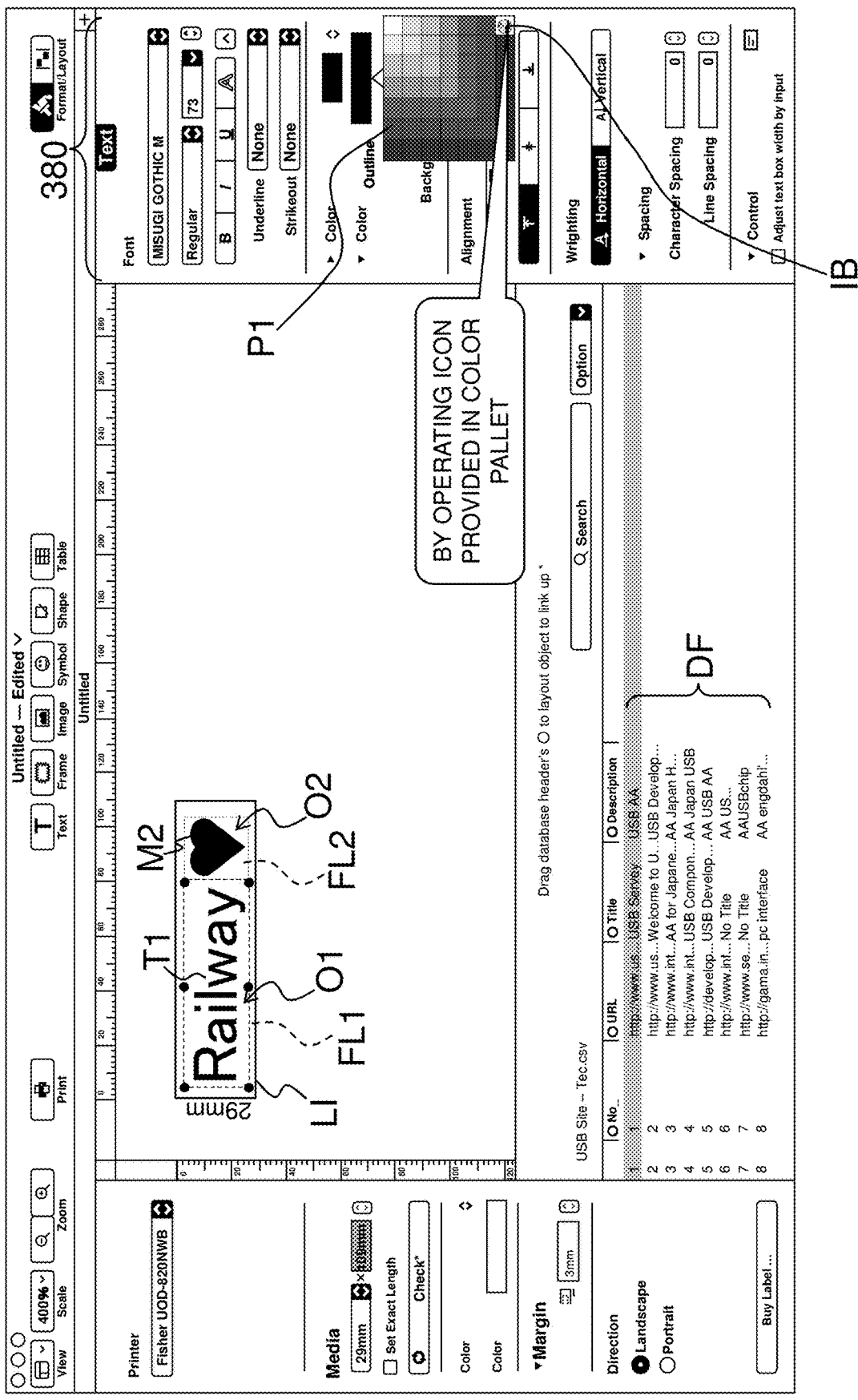

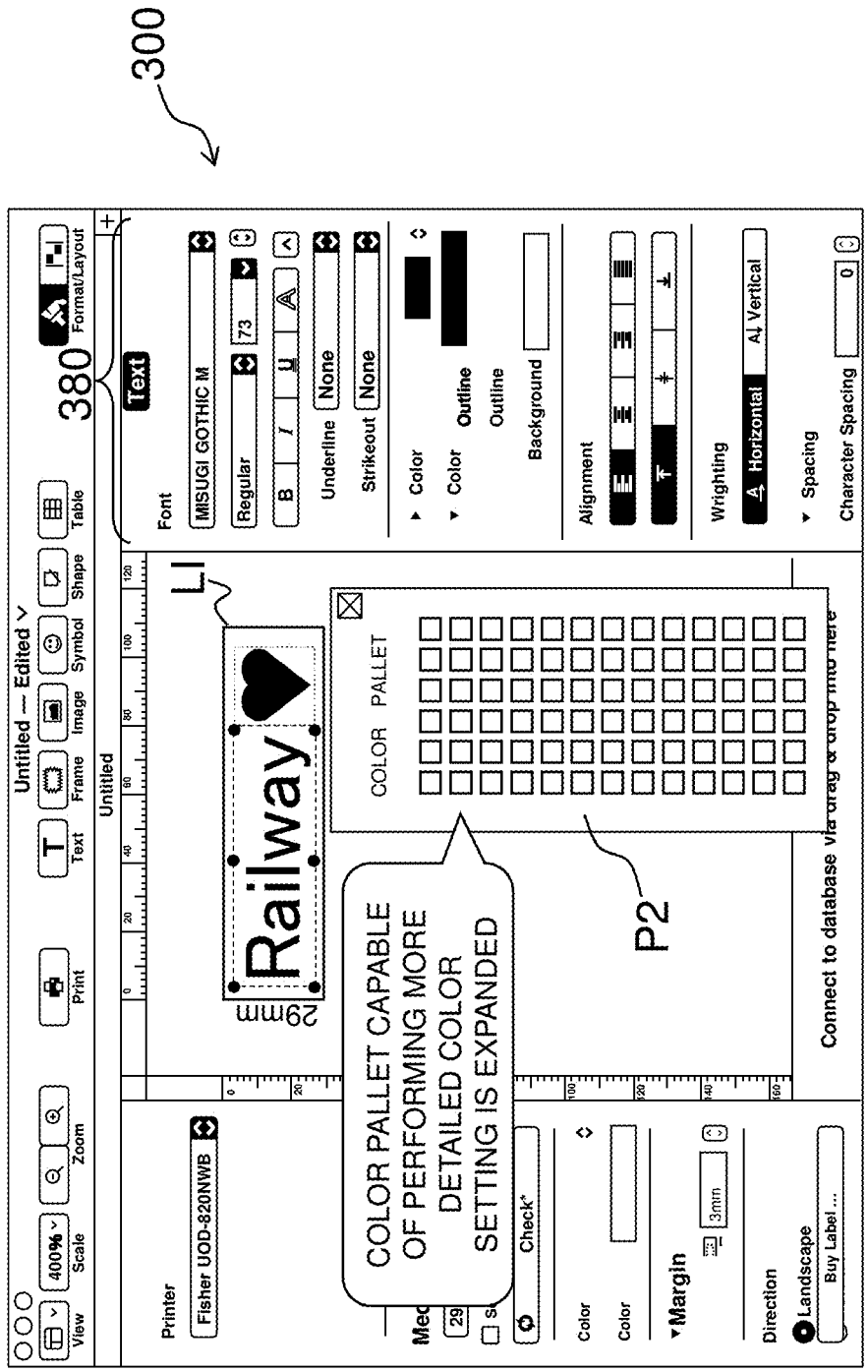
[FIG. 22]

[FIG. 23]
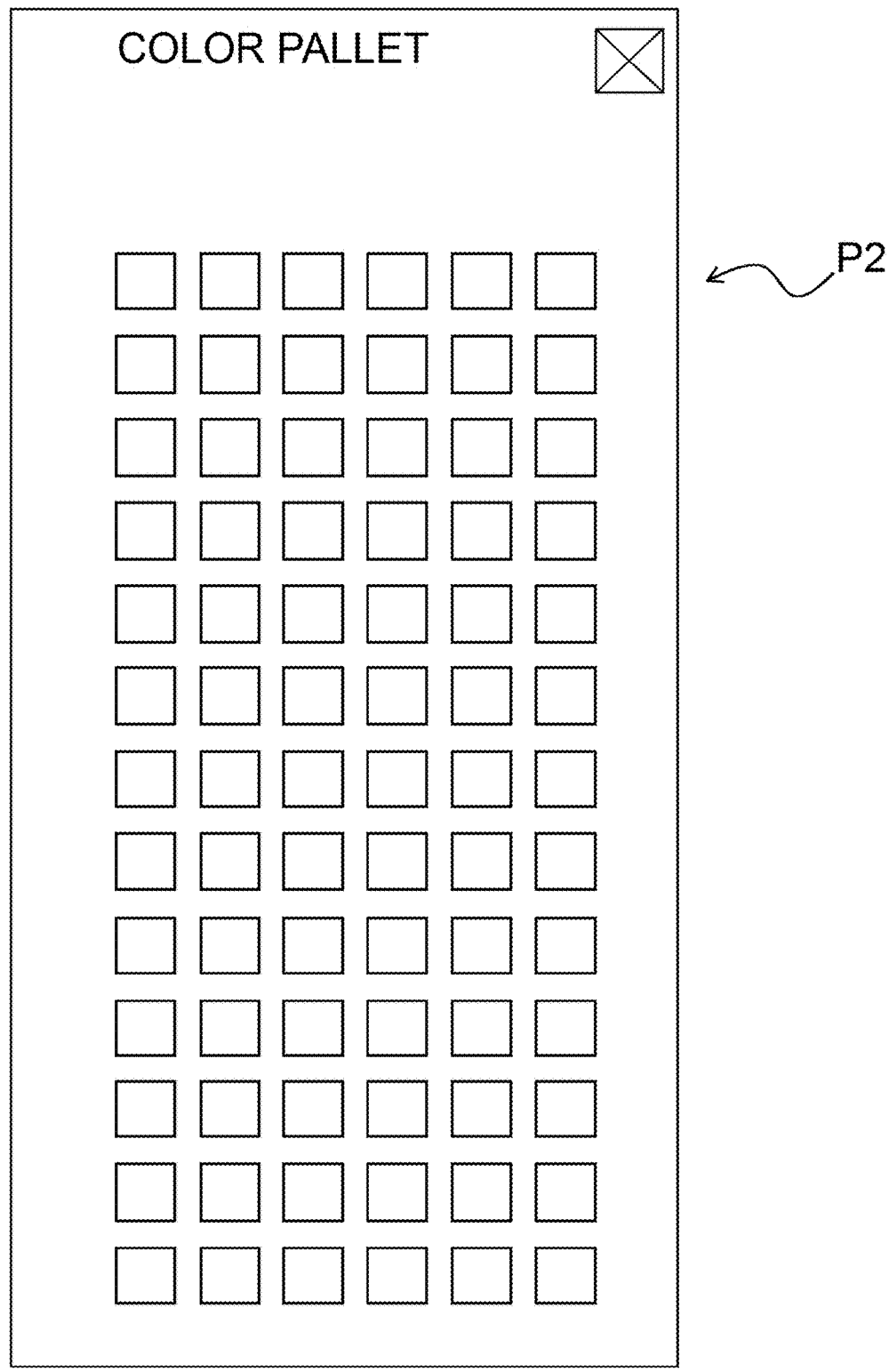

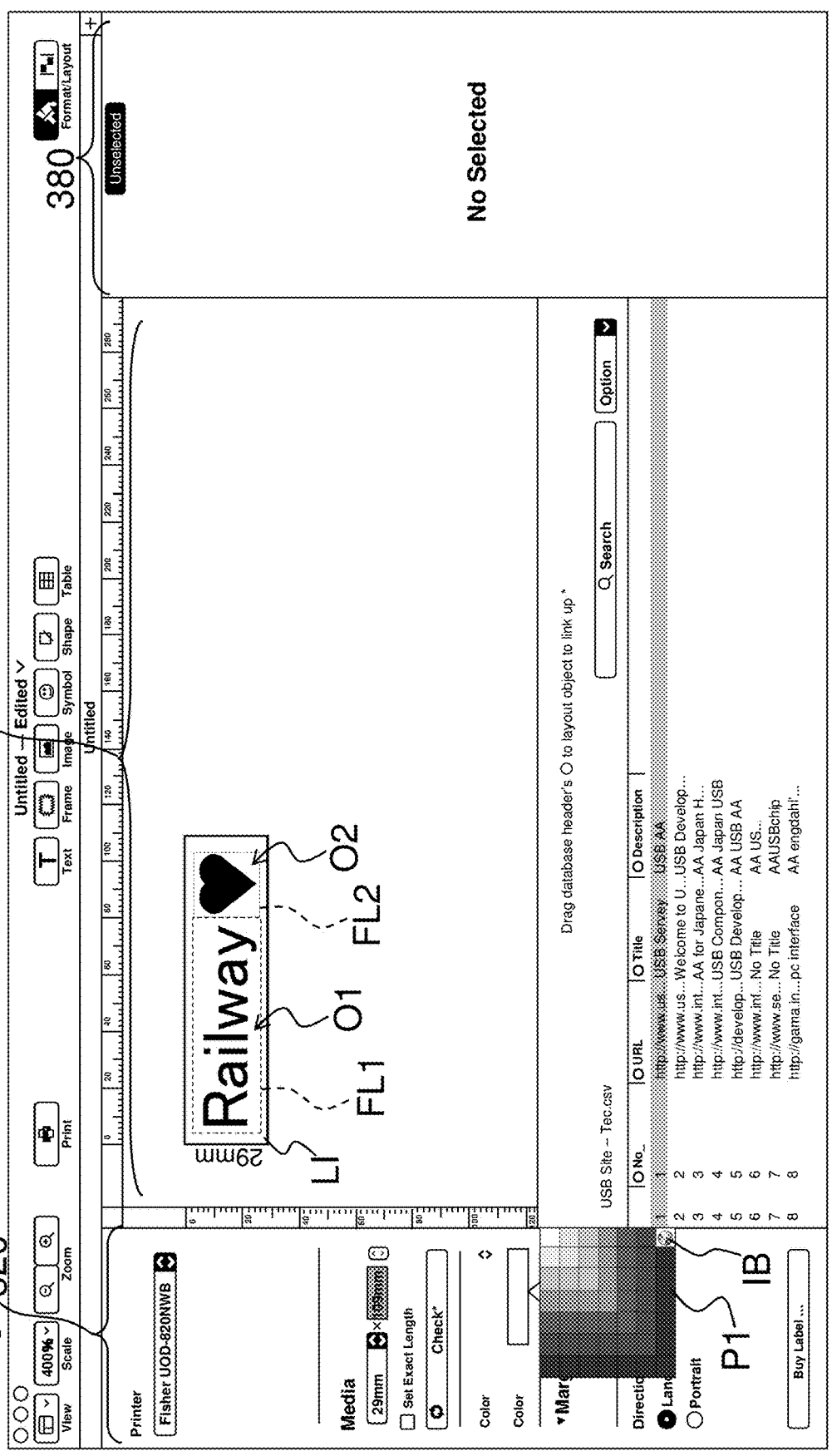

[FIG. 25]
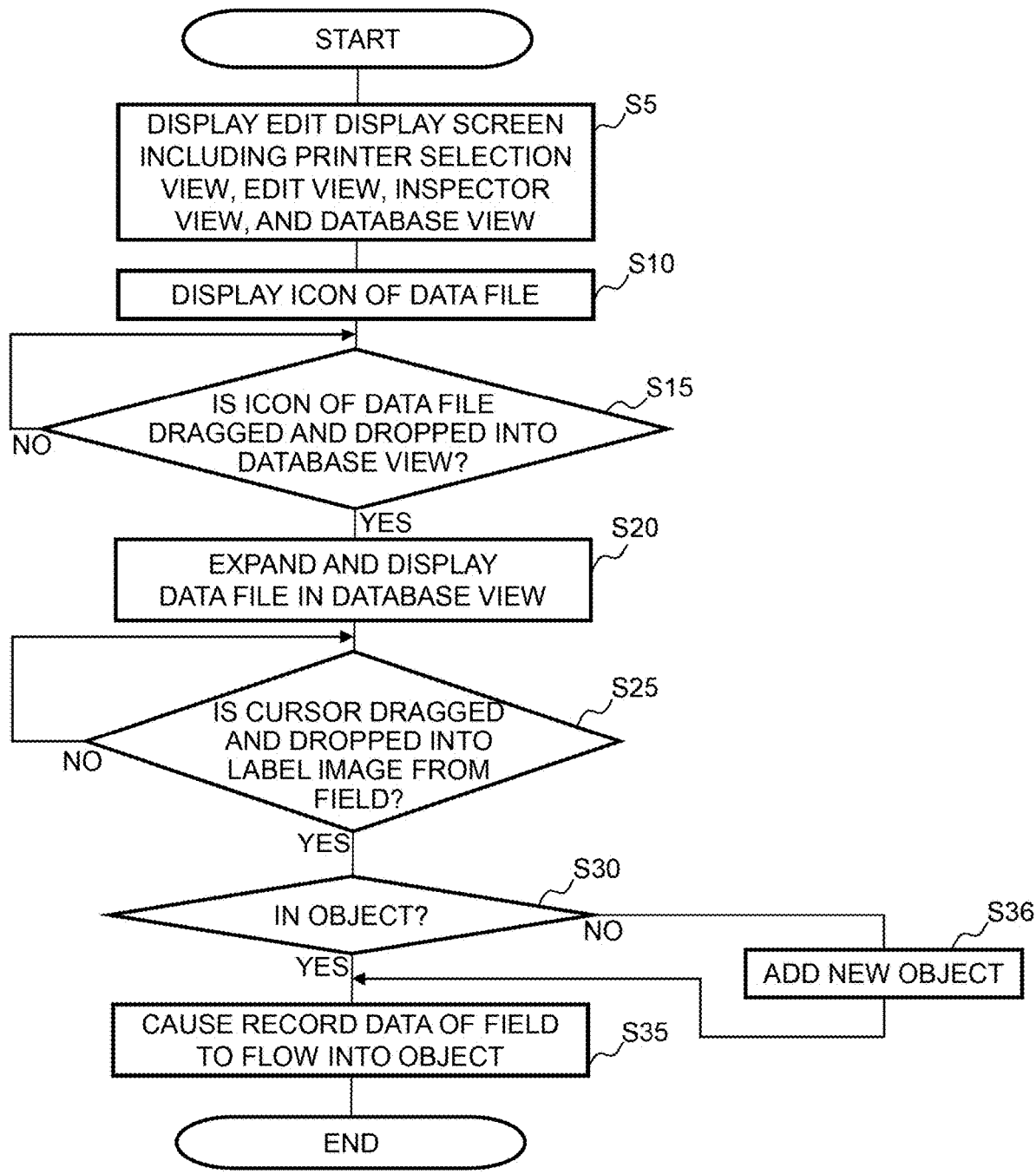

PRINT DATA EDIT APPARATUS AND RECORDING MEDIUM

CROSS-REFERENCE TO RELATED APPLICATION

The present application is a continuation of prior U.S. application Ser. No. 16/128,563, filed Sep. 12, 2018, which claims priority from Japanese Patent Application No. 2017-177954, which was filed on Sep. 15, 2017, the disclosures of which are incorporated herein by reference in its entirety.

FIELD

The present disclosure relates to a print data edit apparatus for performing an editing operation on print data and to a recoding medium for storing a print data editing program for performing the editing operation.

BACKGROUND

A print data edit apparatus, which is connected to a print label producing apparatus for producing a print label using print data, has been known. The print data edit apparatus of a prior art can open a list window and display a data table in a state where an edit display screen (layout window) is displayed. Pieces of data described in the displayed data table are sequentially allocated to respective objects disposed on the edit display screen, and thus a corresponding print label can be produced.

In the print data edit apparatus of the prior art, however, in order to display the list window in the state where the edit display screen is displayed, "open data preparation window" is required to be selected from a window menu. Thus, an operation of the print data edit apparatus is difficult to understand and troublesome for a user.

SUMMARY

An object of the disclosure is to provide a print data edit apparatus and a recording medium which can display a data table on an edit display screen through a simple operation and produce a print label easily.

In order to achieve the above-described object, according to the aspect of the present application, there is provided a print data edit apparatus that is configured to perform an editing operation on print data and to be connected to a print label producing apparatus configured to print on a print-receiving medium by using the print data to produce a print label, the print data edit apparatus comprising a display device, an operation device, and a controller, the controller being configured to execute a first display control process in which an edit display screen is displayed on the display device, wherein the edit display screen includes a print setting area, an editing area and an individual setting area that are disposed side by side with each other from one side toward the other side along a left-to-right direction in the edit display screen, and a disposing area that is capable of disposing a data file prepared separately to be displayed at least at a lower portion of the editing area on the display device, wherein the print setting area is for performing a setting with respect to the print-receiving medium, the editing area is for editing an object to be disposed on the print label, and the individual setting area is for performing a setting with respect to the object, and a second display control process in which the data file is expanded and displayed in the disposing area in the case that a first indicator of the data file displayed on the display device is dragged and dropped to the disposing area via the operation device.

A print data edit apparatus according to the disclosure is used in a state of being connected to a print label producing apparatus which produces a print label using print data. The print data edit apparatus includes a display device. The display device is controlled by a controller to display an edit display screen for editing the print data. When a user performs a suitable editing operation such as producing a desired object on the edit display screen, the print data reflecting the editing operation is transmitted to the print label producing apparatus. Consequently, a print label on which corresponding print data is printed is produced.

In this case, according to the disclosure, the controller executes a first display control process in which the edit display screen displayed on the display device is divided into three areas, that is, a print setting area, an editing area, and an individual setting area, and a disposing area for disposing a data file is provided in a lower portion of the editing area. When a user produces a print label using the data file prepared separately, the user operates an operation device to drag and drop an indicator (for example, an icon or a proper mark) representing the data file, which is displayed on the display device, to the disposing area. Thus, the controller executes a second display control process in which the data file is expanded in the disposing area, and, for example, a data table is displayed. Consequently, a user can produce a print label easily through a simple operation.

The print setting area, the editing area, and the individual setting area are disposed on the edit display screen side by side from one side (for example, left side) of a left to right direction toward the other side (for example, right side) in accordance with a producing procedure of a print label. Thus, a user is only required to operate the operation device so as to sequentially perform operations on the edit display screen from the one side toward the other side in accordance with the operation procedure at the time of producing the print label. Consequently, a user can easily perform the operations in a plain way.

BRIEF DESCRIPTION OF THE DRAWINGS

FIG. 1 is a system configuration diagram schematically showing a print system which includes a print data edit apparatus, for executing a print process program, according to an embodiment of the disclosure.

FIG. 2 is a functional block diagram showing detailed functions of individual portions of the print system.

FIG. 3 is a diagram showing an example of display contents of a display screen which is displayed on a display unit of an operation terminal.

FIG. 4 is a diagram for explaining a setting example in a printer selection view.

FIG. 5 is a diagram for explaining a setting example in the printer selection view.

FIG. 6 is a diagram for explaining a setting example in the printer selection view.

FIG. 7 is a diagram for explaining a setting example in the printer selection view.

FIG. 8 is a diagram for explaining a display example on an inspector view.

FIG. 9 is a diagram for explaining a display example on the inspector view.

FIG. 10 is a diagram for explaining a procedure in a case that a data file is expanded by dragging and dropping an icon of the data file.

FIG. 11 is a diagram for explaining the procedure in the case where the data file is expanded by dragging and dropping the icon of the data file.

FIG. 12 is a diagram for explaining the procedure in the case where the data file is expanded by dragging and dropping the icon of the data file.

FIG. 13 is a diagram for explaining the procedure in the case where the data file is expanded by dragging and dropping the icon of the data file.

FIG. 14 is a diagram for explaining a procedure in which data of the data file expanded in a database view is caused to flow into an editing view.

FIG. 15 is a diagram for explaining the procedure in which the data of the data file expanded in the database view is caused to flow into the editing view.

FIG. 16 is a diagram for explaining the procedure in which the data of the data file expanded in the database view is caused to flow into the editing view.

FIG. 17 is a diagram for explaining the procedure in which the data of the data file expanded in the database view is caused to flow into the editing view.

FIG. 18 is a diagram for explaining the procedure in which the data of the data file expanded in the database view is caused to flow into the editing view.

FIG. 19 is a diagram for explaining the procedure in which the data of the data file expanded in the database view is caused to flow into the editing view.

FIG. 20 is a diagram showing a state in which an object is disposed variously in an inspector view.

FIG. 21 is a diagram showing a state in which a color pallet is displayed on the inspector view.

FIG. 22 is a diagram showing a state in which a color pallet is displayed.

FIG. 23 is a diagram showing a detailed example of the color pallet.

FIG. 24 is a diagram showing a state in which the color pallet is displayed on a printer selection view.

FIG. 25 is a flowchart showing an example of a control procedure which is executed by a CPU of the operation terminal.

DETAILED DESCRIPTION OF THE EMBODIMENT

An embodiment according to the disclosure will be explained with reference to drawings.

An entire configuration of a print system, which includes a print data edit apparatus for executing a print process program according to the embodiment, will be explained with reference to FIGS. 1 and 2. In FIG. 1, a print system 1 includes at least one operation terminal 2 which is configured of, for example, a general-purpose personal computer, and at least one label printer 3 which is connected to the operation terminal 2 via a communication network NW such as LAN. Each operation terminal 2 is connected to each label printer 3 via the communication network NW so as to be able to transmit and receive information to each other.

Each label printer 3 transmits and receives various information and instruction signals to and from each operation terminal 2, and produces a print label, on which desired characters, graphics, and the like are printed, based on an operation of a user (operator) using the operation terminal 2. In this case, the label printer 3 can produce a print label (not shown) of an optional length, using a print-receiving tape of a predetermined width which is wound around a tape roll mounted on the label printer 3. The label printer 3 can selectively attach and detach plural types of tape rolls or cartridges in accordance with the type of a print-receiving tape. That is, a user can optionally select the print-receiving tape of a predetermined type of width size (sheet size). In this embodiment, plural models of the label printers 3 are connected to the communication network NW, and each operation terminal 2 can selectively operate one of the plural models of the label printers 3 via the communication network NW.

As shown in FIG. 2, the operation terminal 2 includes a CPU 12, a memory 13 formed of, for example, a RAM and a ROM, an operation unit 14, a display unit 17, a communication controller 15, and a mass storage 16.

The operation unit 14 is configured of, for example, a mouse and a keyboard which input an instruction and information from a user. The display unit 17 displays various information and messages. The communication controller 15 controls transmission/reception of an information signal to/from the label printer 3. The mass storage 16 stores various programs and information. The various programs and information stored in the mass storage 16 will be described later. The CPU 12 performs various processes and transmits/receives various instruction signals and information signals to/from the label printer 3 in accordance with the programs stored in the ROM and the mass storage 16 in advance while utilizing a temporary storing function of the RAM.

As shown in FIG. 2, the label printer 3 includes a control circuit 202, a tape roll holder 210, a printing head 205, a cutter 207, a communication controller 208, and a transfer unit 209. The tape roll holder 210 can attach and detach a tape roll 204 (or a cartridge having the tape roll 204) around which a print-receiving tape 203 (that is, a sheet which has a spiral shape originally but is illustrated as a concentric shape for the sake of simplification) is wound. The printing head 205 performs a desired print on the print-receiving tape 203 which is unreeled from the tape roll 204. In this example, the printing head 205 is configured to be able to perform the print using desired colors of a user according to the known method (detailed explanation is omitted). The cutter 207 cuts the tape 203, the print of which has been completed, at a predetermined length, thereby forming a print label. The transfer unit 209 is provided so as to face the printing head 205. The transfer unit 209 is controlled by the control circuit 202 to transfer the tape 203 unreeled from the tape roll 204. The control circuit 202 is connected to the communication controller 15 of the operation terminal 2 via the communication controller 208 and the communication network NW, whereby the label printer 3 can transmit/receive information to/from the operation terminal 2.

<Display on Screen Using Print Data Editing Application>

In the print system 1 according to the embodiment, a user can perform an editing and printing operation on print contents of a print label (in other words, print data corresponding to the print contents, the same applies hereafter) by operating the print data editing application which is operated on the operation terminal 2. When a user activates the print data editing application on the operation terminal 2, the CPU 12 controls the display unit 17 to display, for example, an edit display screen 300 shown in FIG. 3.

<Three Views>

In FIG. 3, the edit display screen 300 is divided into three areas (views), that is, a printer selection view 320, an editing view 350, and an inspector view 380 from the left toward the right. A database view 310 is provided in a lower portion of at least the editing view 350 of the display unit 17. Alternatively, these three views may be provided from the right toward the left. The database view 310 may be provided in a lower portion of the printer selection view 320 and the editing view 350, a lower portion of the editing view 350 and the inspector view 380, or a lower portion of these three views.

The printer selection view 320 is an area for producing settings with respect to the print-receiving tape 203. The printer selection view 320 includes a printer selection field 321 for displaying and selecting the model of the label printer 3 which prints a print label. For example, when a user operates a Δ button or a ∇ button at the right end of the printer selection field 321 by an appropriate operation via the operation unit 14, a printer box which displays a list of a plurality of printer model names (or printer names set by a user, or icons or the like corresponding to external appearances of the printers) is displayed in an expanded manner in the up and down direction (not shown). A user can select one printer model from the list. Alternatively, the operation terminal 2 may obtain model information from the label printers 3 connected thereto and automatically display the model information on the printer selection field 321.

The printer selection view 320 further includes a label width setting field 322A, a size change check box 322B, a label length setting field 322C, and a size acquisition button 322D.

The label width setting field 322A is a field for selecting and setting a width of the print-receiving tape 203 (in other words, a print label) which is mounted on the label printer 3. The label length setting field 322C is a field for setting a length of a print label which is produced using the print-receiving tape 203.

The size change check box 322B is a box for setting, based on presence or absence of a check, whether or not to change a label size in accordance with editing results (the number of characters of a text, and the like) with respect to a label layout in the editing view 350.

The size acquisition button 322D is a button for automatically acquiring a size of the print-receiving tape 203 which is mounted on the label printer 3.

In this case, the label width setting field 322A and the label length setting field 322C are each displayed in such a way that a display mode thereof is changed in accordance with the type of a print-receiving medium, for example, whether or not to produce a constant-length label (so called a die cut label) whose label length is fixed, or whether or not to produce a non-constant-length label whose a label length changes in accordance with a layout of print contents (details will be described later).

The printer selection view 320 can further perform settings peculiar to the selected label printer 3 (color, margin, direction, etc. of the print-receiving tape 203).

<Editing View>

The editing view 350 is an area for editing an object to be disposed on a print label. A preview (formed of a label image LI and an editing area frame FL disposed in the label image LI) of a print label to be produced is displayed on the editing view 350. A user can insert and edit an optional object (text object or the like) in the editing area frame FL by appropriately operating the operation unit 14. Display contents of the label image LI and the editing area frame FL correspond to various selecting and setting results in the printer selection view 320 and change when the selecting and setting results change (details will be described later).

<Inspector View>

The inspector view 380 is an area for performing settings with respect to an object being selected in the editing view 350. The inspector view 380 includes a format area for performing settings peculiar to an object (font, character color, background color, etc. in a case of, for example, a text object) and a layout area for producing settings not depending on the type of an object (position, size, etc. of an object) (details will be described later).

<Database View>

The database view 310 is an area for disposing a data file produced separately. As shown in FIG. 3, the database view 310 displays, in an initial state, a message MS ("Connect to database via drag & drop into here") representing that the data file can be disposed.

<Setting Example of Printer Selection View>

FIG. 4 shows an example of actual selection and setting in the printer selection view 320.

FIG. 4 shows an example in which a label printer of type "UOD-820NWB" manufactured by Fisher Co, Ltd. is selected and displayed in the printer selection field 321 by a user's appropriate operation via the operation unit 14.

Further, when a Δ button or a ∇ button at the right end of the label width setting field 322A is operated by a user's appropriate operation via the operation unit 14, a list R is expanded in a pull-down format. In this example, in the list R, individual sizes such as "width 17 mm×length 54 mm", "width 17 mm×length 87 mm", "width 23 mm×length 23 mm", "width 29 mm×length 42 mm", "width 29 mm×length 90 mm", "width 38 mm×length 90 mm", "width 39 mm×length 48 mm", "width 52 mm×length 29 mm", "width 54 mm×length 29 mm", "width 60 mm×length 86 mm", "width 62 mm×length 29 mm", and "width 62 mm×length 100 mm" corresponding to the constant-length labels and individual sizes such as "width 12 mm", "width 29 mm", "width 38 mm", "width 50 mm", "width 54 mm", and "width 62 mm" corresponding to the non-constant-length labels are displayed as a list so as to be selectable.

In the example shown in FIG. 4, the constant-length label of "width 62 mm×length 100 mm" is selected in the list R. FIG. 5 shows a state in which this selection is determined. As shown in FIG. 5, the label image LI of "width 62 mm×length 100 mm" and the editing area frame FL having the sizes correspond to this label image LI are displayed on the editing view 350. When the constant-length label is selected in this manner, as shown in FIG. 5, none of the size change check box 322B and the label length setting field 322C are displayed.

On the other hand, when the non-constant-length label is selected in the list R shown in FIG. 4, firstly the size change check box 322B and the label length setting field 322C are displayed as usual (without not being displayed unlike the above-described case).

Thereafter, when the size change check box 322B is checked, the label length setting field 322C is placed in a selectable and input-acceptable state. FIG. 6 shows a case that "27 mm" is selected in the label length setting field 322C. The label image LI of "width 36 mm×length 27 mm" corresponding to the selection and the editing area frame FL having the sizes corresponding to this label image LI are displayed on the editing view 350.

When the size change check box 322B remains unchecked, an automatic length setting state is set and the label length setting field 322C is hidden, whereby the label image LI extends in accordance with a text, etc. input in the editing area frame FL. FIG. 7 shows a state in which a character string T1, that is, "Railway" is input in an editing area frame FL1 by a user's appropriate operation of the operation unit 14, and thereby an object (text object) O1 is generated. Since the size is automatically adjusted in correspondence with the input character string T1, the label image LI of "width 29 mm×length 83 mm" and the editing area frame FL having the sizes correspond to this label image LI are displayed.

<Display Example of Inspector View>

The inspector view 380 changes an item to be displayed thereon in accordance with an object which is displayed on the editing view 350. For example, FIG. 8 shows a state in which the object O1 formed of the editing area frame FL1 and the character string T1 of "Railway" (hereinafter appropriately called "text object O1") and an object O2 formed of an editing area frame FL2 and a heart mark M2 (that is, an image object, which is hereinafter appropriately called "image object O2") are input and displayed according to the method described with reference to FIG. 7. In the example shown in FIG. 8, the text object O1 is selected by appropriately operating the operation unit 14. The selected object is displayed by small black points called handles which are disposed on the four corners and the midpoints of the four sides of the editing area frame corresponding to the object. Incidentally, the handles of the black points of the individual sides may not be displayed depending on, for example, a size of the editing area frame.

In this example, as shown in FIG. 8, the inspector view 380 displays a position setting field 380A, a size setting field 380B, a rotation setting field 380C, and a front-rear setting field 380D.

The position setting field 380A is a field for setting how to adjust a relative positional relation of the text object O1 with respect to a print area set in a predetermined mode in the label image LI. The size setting field 380B is a field for setting width/length sizes and a width/length ratio of the text object O1. The rotation setting field 380C is a field for setting whether to rotate the text object O1 disposed in the label image LI clockwise or counterclockwise. The front-rear setting field 380D is a field for setting whether to move the text object O1 to the rear side or the front side with respect to another object.

FIG. 9 shows a state in which the image object O2 is selected by a user's appropriate operation via the operation unit 14. Handles are displayed on the editing area frame FL2 of the selected image object O2. As shown in FIG. 9, the inspector view 380 displays an image file setting field 380E in this case. The image file setting field 380E displays a feature of the image object O2, for example, a screen shot, image creation date and time, a file attribute, and the like.

<Object Generation by Expanding Data File>

A feature of the embodiment is that a data file can be expanded in the database view 310 using an icon of the data file, and an object can be generated in the editing view 350 using data contents in the expanded data file. Hereinafter, the process of generating an object will be explained in detail.

FIG. 10 is a state in which an icon IC (or another proper mark, or the like) of a data file DF containing desired data (see FIG. 13, etc. explained later) is displayed on the printer selection view 320 by a user's appropriate operation via the operation unit 14 in a state that, for example, the text object O1 and the image object O2 are displayed as shown in FIGS. 8 and 9.

In this state, for example, as shown in FIG. 11, the icon IC is dragged downward from the editing view 350 to the database view 310 by a user's appropriate operation via the operation unit 14. Then, as shown in FIG. 12, the icon IC thus dragged is dropped to the database view 310. Thus, as shown in FIG. 13, the data file DF is automatically expanded in the database view 310 and a list of data in the data file DF is displayed (in a data table format). In the example shown in FIG. 13, four fields "No.", "URL", "Title", and "Description" are provided in the data file DF, and data is allocated to eight records Nos. 1-8 in correspondence with the four fields. As shown in FIG. 13, the record No. 1 is selected in a default state (see black portion).

In this state, for example, as shown in FIG. 14, a user appropriately operates the operation unit 14 to designate one field (in this example, "Title") in the data file DF using a mouse pointer MP by a user's appropriate operation via the operation unit 14. Then, as shown in FIG. 15, a user drags and drops the mouse pointer MP to the object (in this example, text object O1 "Railway") into which data is caused to flow.

Thus, as shown in FIG. 16, corresponding data is automatically caused to flow into the editing area frame FL1 of the text object O1. In this example, as shown in FIG. 16, of data disposed in order of record No. in the field "Title", "USB Survey" contained in the selected record No. 1 is caused to flow into the text object O1. Consequently, as shown in FIG. 16, a character string T1' of "USB Survey" is allocated to the editing area frame FL1 in place of the character string T1 of "Railway" having been provided in the text object O1.

In this case, data in the field designated by the mouse pointer MP (in this example, "Title") is linked to the dropped object (in this example, text object O1) to each other in such a way that data in the object changes when a record selected in the field changes. For example, as shown in FIG. 17, when the second record of the field "Title" is selected, a character string T1" of "Welcome to USA" is allocated to the text object O1 using data "Welcome to USA" of the second record.

The embodiment is not limited to the above-described case in which the mouse pointer MP is dragged and dropped into an already displayed object in the editing view 350, and thereby a character string or the like in the object is replaced with data designated by the mouse pointer. That is, in a state in which only the editing area frame FL (containing no character string or the like) is displayed on the editing view 350 (see, for example, FIGS. 3 to 6, etc.), the mouse pointer MP may be dragged and dropped into the editing area frame FL, and thereby a character string or the like may be generated in the editing area frame FL to complete an object.

Alternatively, a user may drag and drop the mouse pointer MP into a position in which no object exists. For example, in an example shown in FIG. 18, the mouse pointer MP is dragged and dropped into a position in which no object exists (in this example, right side of the image object O2) by a user' appropriate operation via the operation unit 14. In this case, as shown in FIG. 19, a new editing area frame FL3 is formed adjacent to the right side of the image object O2 and the character string "USB Survey" is caused to flow into the editing area frame FL3. Consequently, a new text object O3 formed of the character string T3 of "USB Survey" and the editing area frame FL3 is generated.

An object, which is generated using the data file DF and displayed on the editing view 350 in the above-described manner, can be variously set and arranged using the inspector view 380 as described above. For example, FIG. 20 shows a state in which, of the text object O1 and the image object O2 shown in FIG. 18, a user selects the text object O1 and then operates a "Left" button of the rotation setting field 380C to rotate the text object O1 counterclockwise by 90 degrees.

<Color Setting Using Pallet>

As another feature, the embodiment can set a print color (so called a character color or the like) at the time of printing an object using a color pallet and also set a color (so called a background color) with which a background area is printed at the time of printing a character string or an image with the print color. Hereinafter, the process of the color setting will be explained in detail.

FIG. 21 shows a state in which, of the text object O1 (including the character string T1 of "Railway") and the image object O2 (including the mark M2) generated in the above-described manner, the text object O1 is selected. In this state, when a "color" button provided in the inspector view 380 (which is displayed separately from the inspector view 380 shown in FIG. 8, etc. by an appropriate operation) is operated by a user's appropriate operation via the operation unit 14, a color-setting color pallet P1 is displayed. As shown in FIG. 21, the color pallet P1 is configured in such a way that plural colors for setting the print color (the character color described above) of an object are arranged in a grid pattern so as to be selectable. Specifically, different colors are arranged in a transverse direction and colors different in density and hue are arranged in a longitudinal direction. In this case, 7×7 cells (except for the cell at the lower right corner) are allocated to the respective colors. When a user selectively operates one of the 7×7 cells by appropriately operating the operation unit 14, the print color of the text object O1 can be selected.

Of the color pallet P1, an icon IB (or may be another proper mark or the like) is provided on the cell of the lower right corner. The icon IB is used for calling a high-functional color pallet P2 provided separately from the color pallet P1. That is, when the icon IB is operated by a user's appropriate operation via the operation unit 14, the high-functional color pallet P2 for selecting more detailed print color of the text object O1 is expanded and displayed as shown in FIG. 22.

As shown in FIG. 23, the color pallet P2 is configured in such a way that 6×13=78 cells having colors different in density and hue from one another are arranged. A user can select the print color of the text object O1 by appropriately operating the operation unit 14 to operate one of the 6×13 cells.

Incidentally, as shown in FIG. 24, a color pallet P1 similar to the color pallet described above can also be displayed by operating a "color" button provided in the printer selection view 320 through a user's appropriate operation via the operation unit 14. This color pallet P1 is used for setting the background color. Also in this color pallet P1, when an icon IB provided on the cell of the lower right corner is operated, a color pallet P2 (not shown) similar to that shown in FIGS. 22 and 23 is expanded and displayed.

<Control Procedure>

An example of a control procedure for achieving the above-described process, which is executed by the CPU 12 of the operation terminal 2, is shown in FIG. 25. A flowchart shown FIG. 25 starts when the editing application is activated on the operation terminal 2.

Firstly, in Step S5, the CPU 12 controls the display unit 17 to display the edit display screen 300 which includes the printer selection view 320, the editing view 350, the inspector view 380, and the database view 310 (see FIGS. 3 to 5, etc.).

Thereafter, in Step S10, the CPU 12 displays the icon IC of the data file DF including the desired data on the printer selection view 320 which is displayed in Step S5 based on a user's appropriate operation via the operation unit 14 (see FIG. 10).

In Step S15, the CPU 12 determines whether or not the icon IC displayed in Step S10 is dragged and dropped into the database view 310 by a user's appropriate operation via the operation unit 14. When the icon IC is not dragged and dropped into the database view 310, the determination in Step S15 is not affirmative (NO in Step S15), and thus this loop is maintained. In contrast, when the icon IC is dragged and dropped into the database view 310, the determination in Step S15 is affirmative (YES in Step S15), and thus the process proceeds to Step S20.

In Step S20, the CPU 12 expands the data file DF and controls the display unit 17 to display a list of the data in the data file DF on the database view 310 (see FIG. 13, etc.).

Thereafter, in Step S25, the CPU 12 determines whether or not a designated field in the database view 310 is dragged and dropped into the label image LI. When the designated field is not dragged and dropped into the label image LI, the determination in Step S25 is not affirmative (NO in Step S25), and thus this loop is maintained. In contrast, when the designated field is dragged and dropped into the label image LI, the determination in Step S25 is affirmative (YES in Step S25), and thus the process proceeds to Step S30.

In Step S30, the CPU 12 determines whether or not the position, into which the designated field is dragged and dropped in Step S25, is in the object which already exists in the label image LI (or the object which already exists in the editing area frame FL, the same applies hereafter). When the position is in the object (see FIG. 15), the determination in Step S30 is affirmative (YES in Step S30), and thus the process proceeds to Step S35. In contrast, when the position is outside the object, the determination in Step S30 is not affirmative (NO in Step S30), and thus the process proceeds to Step S36.

In Step S36, the CPU 12 controls the display unit 17 to newly add an object in the label image LI (or the editing area frame FL) (see FIG. 19). Thereafter, the process proceeds to Step S35.

In Step S35, the CPU 12 causes the data of the corresponding record in the designated field, which is an origination of the drag and drop operation in Step S25, to flow into the target object. Thereafter, the CPU 12 terminates this flowchart.

<Advantage of Embodiment>

As described above, when a user drags and drops the icon IC representing the data file DF to the database view 310, the data file DF is expanded in the database view 310 and the data table is displayed. Thus, a user can produce a print label easily by a simple operation. Further, the printer selection view 320, the editing view 350, and the inspector view 380 are disposed side by side in the edit display screen 300 in this order from the left toward the right in accordance with the producing procedure of the print label. Thus, a user is only required to operate the operation unit 14 so as to sequentially perform operations on the edit display screen 300 from the left side toward the right side in accordance with the operation procedure at the time of producing the print label. Consequently, a user can easily perform the operations in a plain way.

Particularly, in this embodiment, when a user drags and drops the data contents of the data file DF, which is expanded and displayed on the database view 310 in the above-described manner, to the object (the text object O1 in the above-described example) in the editing view 350, the dragged and dropped data contents are incorporated in the object. Specifically, the data contents of the text object O1 in the editing view 350 are replaced with the dragged and dropped data contents (in the above-described example, the character string T1' of "USB Survey"). When only the editing area frame FL exists in the editing view 350, the dragged and dropped data contents are formed in the editing area frame FL as a new object. Consequently, a user can more easily produce a print label.

Particularly, in this embodiment, the database view 310 displays, in the initial state, the message MS ("Connect to database via drag & drop into here") that the data file can be disposed. Thus, a user can reliably recognize that the area disposed in the lower portion of the editing view 350 is the data file view 310 in which the data file DF can be disposed and expanded by the drag and drop operation.

Particularly, in this embodiment, as explained with reference to FIGS. 8 and 9, when one of the plurality of objects is selected in the state that these objects are displayed on the editing view 350, the item displayed on the inspector view 380 is changed in accordance with the type of the selected object. Thus, since a user can reliably perform the setting in the inspector view 380 for each object displayed on the editing view 350 without confusion, convenience of a user is improved.

Particularly, in this embodiment, a plurality of medium setting fields (in the above-described example, the label width setting field 322A and the label length setting field 322C) are displayed side by side in the left to right direction. Thus, a user can easily intuitively set a width and a length of a print-receiving medium. Further, since the display mode of each of the medium setting fields is automatically changed in accordance with the type of a print-receiving medium, a user can reliably perform the setting for each print-receiving medium without confusion, and convenience of a user is improved.

Particularly, in this embodiment, a user can set a print color for the object or the like by selecting a desired color by oneself from a plurality of colors which are arranged in the color pallet P1 in the grid pattern. Further, for example, when a user desires to select the color more in detail, a user can display the color pallet P2 by operating the icon IB disposed in the first color pallet P1. Consequently, since a user can perform the detailed color selection using the displayed color pallet P2, convenience of a user is improved.

The control procedure according to the disclosure is not limited to the flowchart shown in FIG. 25, and various modifications of the control procedure can be made such as adding a process, deleting the process, or changing the order of the processes, within a range not departing from the gist and the technical concept of the disclosure.

In addition to the aforesaid modifications, the disclosure may be modified by appropriately combining the techniques of the embodiment and the modified examples described above.

What is claimed is:

1. A print data edit apparatus that is configured to perform an editing operation on print data and to be connected to a print label producing apparatus configured to print on a print-receiving medium by using said print data to produce a print label, the print data edit apparatus comprising:
   a display device;
   an operation device; and
   a controller, the controller being configured to execute:
      a first display control process in which an edit display screen is displayed on said display device, wherein said edit display screen includes an editing area that is for editing an object to be disposed on said print label and a database view area that is capable of disposing a data file prepared separately, said object including an editing frame and a character string disposed in said editing frame;
      a second display control process in which said data file is expanded and displayed in a data table in said database view area in a case that a first indicator of said data file displayed on said display device is dragged and dropped to said database view area via said operation device, wherein data corresponding to a plurality of fields is allocated to said data table; and
      a third display control process in which said object and said field are associated with each other and data generated by replacing data in said object with data allocated in said field are displayed in said editing area in a state where said object is displayed in said editing area, in a case that a desired field in the data table that is expanded and displayed in said database view area is selected via said operation device and the selected field is dragged and dropped to said object via said operation device.

2. The print data edit apparatus according to claim 1, wherein
   in said first display control process, at least a part of said database view area is displayed at a lower portion of said editing area.

3. The print data edit apparatus according to claim 1, wherein
   in said first display control process, said edit display screen is further displayed on said display device, wherein said edit display screen includes a print setting area and said editing area that are disposed side by side with each other from one side toward the other side along a left-to-right direction in the edit display screen, and wherein the print setting area is for performing a setting with respect to said print-receiving medium.

4. The print data edit apparatus according to claim 1, wherein
   in said first display control process, said edit display screen is further displayed on said display device, wherein said edit display screen includes said editing area and an individual setting area that are disposed side by side with each other from one side toward the other side along a left-to-right direction in the edit display screen, and wherein the individual setting area is for performing a setting with respect to said object.

5. The print data edit apparatus according to claim 1, wherein
   in said first display control process, said edit display screen is further displayed on said display device, wherein said edit display screen includes a print setting area, said editing area, and an individual setting area that are disposed side by side with each other from one side toward the other side along a left-to-right direction in the edit display screen, wherein the print setting area is for performing a setting with respect to said print-receiving medium, and wherein the individual setting area is for performing a setting with respect to said object.

6. The print data edit apparatus according to claim 1, wherein
   in said first display control process, in an initial state, a message that said data file can be disposed is displayed in said database view area.

7. The print data edit apparatus according to claim 4, wherein
   in said first display control process, in a case that one of a plurality of objects is selected through an operation of said operation device in a state where said plurality of objects are displayed in said editing area, an item to be displayed in said individual setting area is changed in accordance with a type of the object selected.

8. The print data edit apparatus according to claim 5, wherein
in said first display control process, in a case that one of a plurality of objects is selected through an operation of said operation device in a state where said plurality of objects are displayed in said editing area, an item to be displayed in said individual setting area is changed in accordance with a type of the object selected.

9. The print data edit apparatus according to claim 3, wherein
in said first display control process, a plurality of medium setting fields for setting a width and a length of said print-receiving medium are further displayed side by side with each other along said left-to-right direction in said print setting area, and a display mode of each of said medium setting fields is changed in accordance with a type of said print-receiving medium.

10. The print data edit apparatus according to claim 5, wherein
in said first display control process, a plurality of medium setting fields for setting a width and a length of said print-receiving medium are further displayed side by side with each other along said left-to-right direction in said print setting area, and a display mode of each of said medium setting fields is changed in accordance with a type of said print-receiving medium.

11. The print data edit apparatus according to claim 3, wherein
in said first display control process, a first color pallet is further displayed in said print setting area, wherein a plurality of colors for setting a print color of said object are arranged in a grid pattern in said first color pallet, and a second indicator for displaying a second color pallet provided separately from said first color pallet is disposed and displayed in said first color pallet.

12. The print data edit apparatus according to claim 4, wherein
in said first display control process, a first color pallet is further displayed in said individual setting area, wherein a plurality of colors for setting a print color of said object are arranged in a grid pattern in said first color pallet, and a second indicator for displaying a second color pallet provided separately from said first color pallet is disposed and displayed in said first color pallet.

13. The print data edit apparatus according to claim 5, wherein
in said first display control process, a first color pallet is further displayed in said print setting area or said individual setting area, wherein a plurality of colors for setting a print color of said object are arranged in a grid pattern in said first color pallet, and a second indicator for displaying a second color pallet provided separately from said first color pallet is disposed and displayed in said first color pallet.

14. A non-transitory computer-readable recording medium storing a print data editing program for executing steps on a computing device, said computing device being provided to a print data edit apparatus that includes a display device, an operation device, and said computing device, and that is configured to edit print data, and to be connected to a print label producing apparatus configured to print on a print-receiving medium by using said print data to produce a print label, said steps comprising:
a first display control step for displaying, on said display device, an edit display screen that includes an editing area for editing an object to be disposed on said print label, and a database view area that is capable of disposing a data file prepared separately, said object including an editing frame and a character string disposed in said editing frame;
a second display control step for expanding and displaying said data file in a data table in said database view area in a case that a first indicator of said data file displayed on said display device is dragged and dropped to said database view area via said operation device wherein data corresponding to a plurality of fields is allocated to said data table; and
a third display control step in which said object and said field are associated with each other and data generated by replacing data in said object with data allocated in said field are displayed in said editing area in a state where said object is displayed in said editing area, in a case that a desired field in the data table that is expanded and displayed in said database view area is selected via said operation device and the selected field is dragged and dropped to said object via said operation device.

* * * * *

UNITED STATES PATENT AND TRADEMARK OFFICE
CERTIFICATE OF CORRECTION

| | | |
|---|---|---|
| PATENT NO. | : 11,341,696 B2 | Page 1 of 1 |
| APPLICATION NO. | : 16/706316 | |
| DATED | : May 24, 2022 | |
| INVENTOR(S) | : Aiko Mizutani | |

It is certified that error appears in the above-identified patent and that said Letters Patent is hereby corrected as shown below:

In the Claims

Column 14, Claim 14, Line 32:
Please delete "device wherein" and insert --device, wherein--

Signed and Sealed this
Seventeenth Day of October, 2023

*Katherine Kelly Vidal*

Katherine Kelly Vidal
*Director of the United States Patent and Trademark Office*